(12) United States Patent
Suemitsu et al.

(10) Patent No.: US 8,489,145 B2
(45) Date of Patent: Jul. 16, 2013

(54) RADIO BASE STATION AND BASE STATION CONTROL APPARATUS

(75) Inventors: Taisei Suemitsu, Tokyo (JP); Kuniyuki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 608 days.

(21) Appl. No.: 11/814,284

(22) PCT Filed: Apr. 26, 2005

(86) PCT No.: PCT/JP2005/007904
§ 371 (c)(1),
(2), (4) Date: Jul. 19, 2007

(87) PCT Pub. No.: WO2006/117838
PCT Pub. Date: Nov. 9, 2006

(65) Prior Publication Data
US 2008/0102877 A1    May 1, 2008

(51) Int. Cl.
*H04M 1/00* (2006.01)
*H04B 1/38* (2006.01)

(52) U.S. Cl.
USPC ............................................. 455/560

(58) Field of Classification Search
USPC ............. 370/342, 347, 252, 335, 500, 328, 370/329, 339, 334, 336, 318, 320, 332, 441; 455/561, 43, 67.11, 515, 524, 449, 446, 443, 455/444, 456.6, 436, 437, 453, 522, 63.2
See application file for complete search history.

(56) References Cited

U.S. PATENT DOCUMENTS

| | | | | |
|---|---|---|---|---|
| 5,499,395 A | * | 3/1996 | Doi et al. | 455/422.1 |
| 5,640,676 A | * | 6/1997 | Garncarz et al. | 455/436 |
| 5,898,682 A | * | 4/1999 | Kanai | 370/331 |
| 6,044,249 A | * | 3/2000 | Chandra et al. | 455/62 |
| 6,047,183 A | * | 4/2000 | Kingdon et al. | 455/440 |
| 6,161,022 A | | 12/2000 | Hwang et al. | |
| 6,167,035 A | * | 12/2000 | Veeravalli et al. | 370/331 |
| 6,263,205 B1 | * | 7/2001 | Yamaura et al. | 455/442 |
| 6,266,330 B1 | * | 7/2001 | Jokinen et al. | 370/329 |

(Continued)

FOREIGN PATENT DOCUMENTS

| | | |
|---|---|---|
| CN | 1533200 A | 9/2004 |
| JP | 5 344051 | 12/1993 |

(Continued)

OTHER PUBLICATIONS

U.S. Appl. No. 11/815,045, filed Jul. 30, 2007, Suemitsu, et al.

(Continued)

*Primary Examiner* — Sujatha Sharma
(74) *Attorney, Agent, or Firm* — Oblon, Spivak, McClelland, Maier & Neustadt, L.L.P.

(57) ABSTRACT

A base station control apparatus for controlling a radio base station which carries out radio communications with a mobile communication terminal is characterized in that it includes a control unit for performing a control process of making the radio base station selectively perform either of two or more processes with different throughputs according to the scale of the radio base station. With this structure, the radio base station can have only a function based on to the scale thereof. For this reason, by omitting unnecessary functions, the radio base station can be miniaturized and the manufacturing cost of the radio base station can be reduced.

8 Claims, 15 Drawing Sheets

U.S. PATENT DOCUMENTS

| | | | |
|---|---|---|---|
| 6,301,234 B1 * | 10/2001 | Lee | 370/331 |
| 6,424,833 B1 * | 7/2002 | Iizuka et al. | 455/436 |
| 6,539,227 B1 * | 3/2003 | Jetzek et al. | 455/442 |
| 6,597,673 B1 * | 7/2003 | Nobuyasu et al. | 370/331 |
| 6,618,597 B1 * | 9/2003 | Choi | 455/522 |
| 6,640,110 B1 * | 10/2003 | Shapira et al. | 455/562.1 |
| 6,654,614 B2 * | 11/2003 | Morris et al. | 455/522 |
| 6,708,030 B1 * | 3/2004 | Horikawa | 455/436 |
| 6,708,036 B2 * | 3/2004 | Proctor et al. | 455/446 |
| 6,853,845 B2 * | 2/2005 | Hsu et al. | 455/449 |
| 6,993,332 B2 * | 1/2006 | Pedersen et al. | 455/436 |
| 7,054,635 B1 * | 5/2006 | Ritzen et al. | 455/444 |
| 7,111,207 B2 | 9/2006 | Sakai | |
| 7,190,958 B1 * | 3/2007 | Yarkosky | 455/436 |
| 7,272,121 B2 * | 9/2007 | Wilkes et al. | 370/331 |
| 7,292,860 B2 * | 11/2007 | Tobe et al. | 455/446 |
| 7,379,739 B2 * | 5/2008 | Rajkotia et al. | 455/439 |
| 7,899,458 B2 * | 3/2011 | Kakishima et al. | 455/436 |
| 2001/0012778 A1 * | 8/2001 | Eriksson et al. | 455/436 |
| 2002/0032034 A1 * | 3/2002 | Tiedemann et al. | 455/437 |
| 2002/0123365 A1 * | 9/2002 | Thorson et al. | 455/524 |
| 2003/0129982 A1 * | 7/2003 | Perini | 455/442 |

FOREIGN PATENT DOCUMENTS

| | | |
|---|---|---|
| JP | 10 145846 | 5/1998 |
| JP | 10 276475 | 10/1998 |
| JP | 11 55175 | 2/1999 |
| JP | 11 275645 | 10/1999 |
| JP | 2002 204470 | 7/2002 |
| KR | 2003-0005738 | 1/2003 |
| WO | 02 37698 | 5/2002 |
| WO | 02 062001 | 8/2002 |

OTHER PUBLICATIONS

Supplementary European Search Report issued Jan. 26, 2011 in EP 05 73 7126.

* cited by examiner

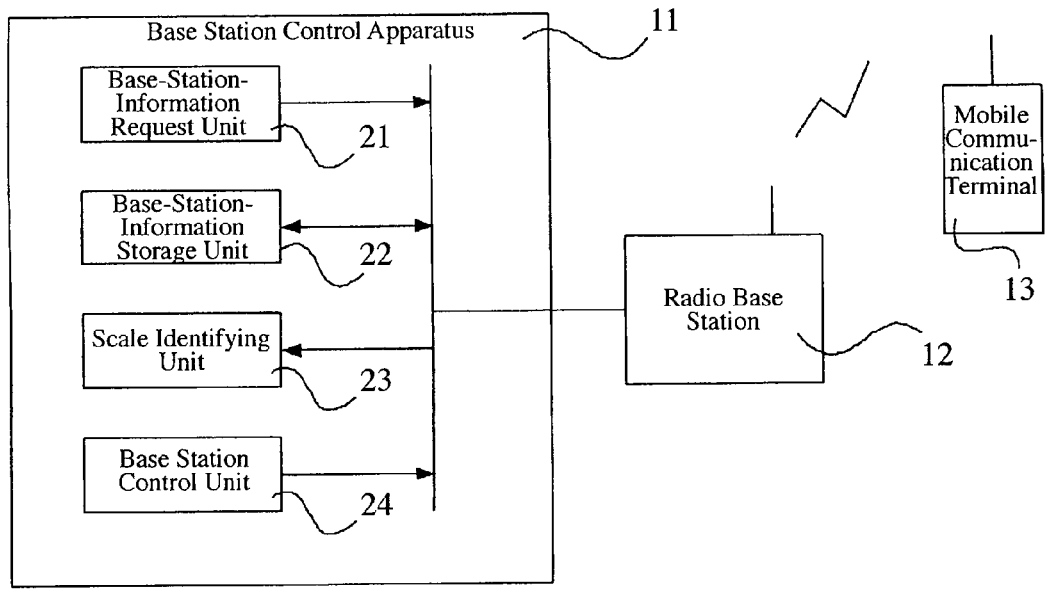
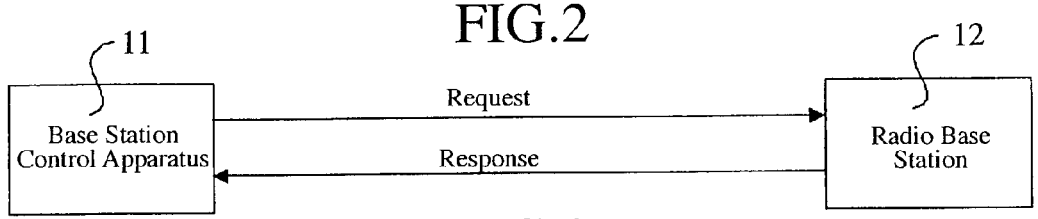
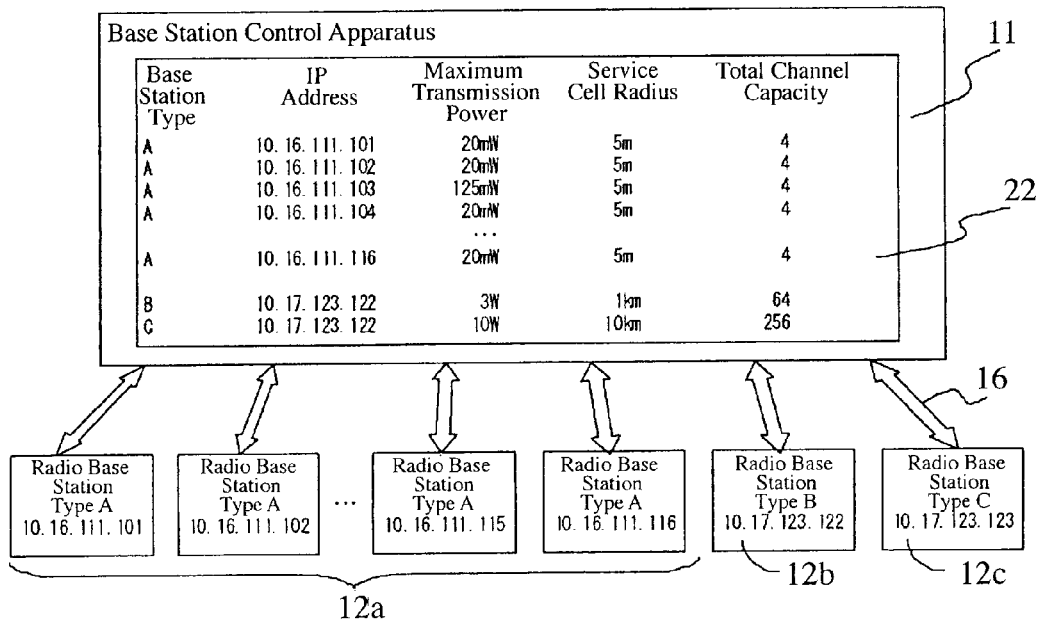

| Power Ratio | TPC Bit Pattern |
|---|---|
| ⋮ | ⋮ |
| -1dB | 00 11 00 11 00 11 00 11 00 11 00 11 00 11 00 |
| 1dB | 11 11 00 11 00 11 00 11 00 11 00 11 00 11 00 |
| 3dB | 11 11 11 11 00 11 00 11 00 11 00 11 00 11 00 <br> 11 11 00 11 00 11 00 11 11 00 11 00 11 00 11 |
| ⋮ | ⋮ |
| 7dB | 11 11 11 11 11 11 11 11 00 11 00 11 00 11 00 <br> 11 11 00 11 11 00 11 11 00 11 11 00 11 11 11 |
| ⋮ | ⋮ |

RADIO BASE STATION AND BASE STATION CONTROL APPARATUS

FIELD OF THE INVENTION

The present invention relates to a radio base station which carries out radio communications with a mobile communication terminal, and a base station control apparatus which controls the radio base station.

BACKGROUND OF THE INVENTION

As radio base stations for use in mobile communications, there are a large base station which provides a relatively-wide service area, and a small base station which provides a relatively-narrow service area. Generally, a large base station has a relatively-wide capacity, which is represented by the number of channels accommodated therein and so on, whereas a small base station has a relatively-small capacity.

For example, in W-CDMA (wide-band code-division multiple access) mobile communications, as a large base station, there is a base station having 2,000 or more channels for sound rates, and as a small base station, there is a base station having about 100 channels.

Mobile communications of cellular type represented by W-CDMA mobile communications provide a relatively-wide service area using a large base station and a small base station as mentioned above. On the other hand, mobile communications of cordless type represented by PHS (Personal Handyphone System) mobile communications (including mobile communications intended for home use) provide a relatively-narrow service area.

Thus, conventionally, mobile communications of cellular type have not been used for a relatively-narrow service area, especially for a home-use service area. However, in recent years, a micro base station which provides a very-narrow service area, such as a home-use service area, has been examined.

However, taking a narrow restricted transmission environment for home use and a small number of users in a private home into consideration, it is not realistic for an individual to install such a micro base station into his or her home and to use it because it is difficult to downsize it and make it fall drop in price because of its having unnecessary functions which comply with transmission environments and a superfluous capacity of accommodating many users. The same goes for a case in which such a micro base station is installed into an elevator or the like.

As a prior art technology, there has been provided a mobile communications system which carries out a different process for a base station according to the type of the base station (refer to patent references 1 to 3). However, because the prior art mobile communications system does not carry out a different process according to the scale of the base station, it is also difficult to downsize it and make it fall drop in price.
[Patent reference 1] JP,10-276475,A
[Patent reference 2] JP,11-055175,A
[Patent reference 3] JP,05-344051,A

DISCLOSURE OF THE INVENTION

Problems to be Solved by the Invention

It is therefore an object of the present invention to provide a base station control apparatus which, in order to make a radio base station have only necessary functions, has functions which correspond to the necessary functions of the radio base station.

Means for Solving the Problems

In accordance with the present invention, there is provided a base station control apparatus for controlling a radio base station which carries out radio communications with a mobile communication terminal, characterized in that the apparatus includes a control unit for performing a control process of making the radio base station selectively perform either of two or more processes with different throughputs according to the scale of the radio base station.

Advantages of the Invention

In accordance with the present invention, the base station control apparatus performs the control process of making the radio base station selectively perform either of two or more processes with different throughputs according to the scale of the radio base station. Therefore, the radio base station can be made to have only a function based on to the scale thereof. For this reason, by omitting unnecessary functions, the radio base station can be downsized and the manufacturing cost of the radio base station can be reduced.

PREFERRED EMBODIMENTS OF THE INVENTION

Embodiment 1

FIG. 1 is a block diagram showing the structure of a mobile communications system in accordance with embodiment 1 of the present invention. The mobile communications system is, for example, a system which complies with the W-CDMA standard, and is provided with a base station control apparatus 11, a radio base station 12, and a mobile communication terminal 13. The base station control apparatus 11 is called a radio network controller (RNC) in accordance with the W-CDMA standard, and, from the radio base station 12 connected thereto and disposed on a lower side of the system, acquires pieces of base station scale information indicating the scale of the base station, like the base station's type, address, maximum transmission power, service cell radius, and total channel capacity, and stores them therein. The base station control apparatus 11 can acquire the pieces of base station scale information directly from the radio base station 12. As an alternative, a scale information server which acquires base station scale information can be placed outside the base station control apparatus, and can receive the pieces of base station scale information, via the scale information server, from the radio base station 12.

A base-station-information request unit 21 makes a request of the radio base station 12 to provide information about the radio base station 12 itself, especially the base station scale information, to the base station control apparatus. A base-station-information storage unit 22 stores the information about the radio base station 12, especially the base station scale information, therein. A scale identifying unit 23 identifies the scale of the radio base station 12 on the basis of the base station scale information stored in the base-station-information storage unit 22. A base station control unit 24 controls the radio base station 12 so as to make the radio base station 12 carry out a process according to the scale identified by the scale identifying unit 23.

FIG. 2 is a diagram showing a procedure for acquiring the base station scale information. First, in step a1, the base-station-information request unit 21 of the base station control apparatus 11 provides notification of a request to offer the base station scale information to the radio base station 12. Next, in step a2, the radio base station 12 informs, as a response to the request from the base station control apparatus 11, the base station scale information to the base station control apparatus 11. Thus, the base station control apparatus 11 can acquire the base station scale information from the radio base station 12, and can identify the scale of the radio base station 12 on the basis of the acquired base station scale information.

FIG. 3 is a diagram showing the base station scale information. In FIG. 3, a plurality of radio base stations 12 are connected to one base station control apparatus 11. As information from a radio base station 11, either of the base station's type, address, maximum transmission power, service cell radius, and total channel capacity, a combination of some of them, or all the pieces of information are acquired from the radio base station 12 and are stored.

A radio base station 12 is a generic name for radio base stations 12a, 12b, and 12c. Each radio base station 12a is a micro base station having a service cell radius of about 5 m which is used either at home or in an elevator. The radio base station 12b is a small base station having a service cell radius of about 1 km. The radio base station 12c is a large base station having a service cell radius of about 10 km. A cable-transmission path 16 is a cable transmission line which connects between the base station control apparatus 11 and each radio base station 12.

Next, the operation of the base station control apparatus 11 will be explained.

First, a case in which information about the base station type is used as the base station scale information will be explained. The base station control apparatus 11 acquires the base station type information from each radio base station 12 connected thereto and disposed on a lower side of the system via the cable line 16. The base station type information is base station scale identification information for identifying the scale of each radio base station 12. Each micro base station 12a corresponds to a base station type A, the small base station 12b corresponds to a base station type B, and the large base station 12c corresponds to a base station type C. Each radio base station 12 transmits the information about its base station type to the base station control apparatus 11. The base station control apparatus 11 stores the information on the base station type acquired from each radio base station 12 in the base-station-information storage unit 22. At this time, the base station type information is stored while being associated with the base station identification information for identifying each radio base station 12. For example, the base station identification information can be an IP (Internet Protocol) address or the like which is specific to each radio base station 12. Since the base station type information stored in the base-station-information storage unit 22 is the information for identifying the scale of each radio base station 12, the scale identifying unit 23 of the base station control apparatus 11 can identify the scale of each radio base station 12 promptly. The base station control unit 24 of the base station control apparatus 11 controls each radio base station 12 so that each radio base station 12 carries out a process according to the identified scale of each radio base station 12.

Next, a case in which an IP address is used as the base station scale information will be explained. An IP address according to a predetermined architecture is attached to each radio base station 12. The architecture for IP addresses which is mentioned here is an addressing architecture which includes the scale of each radio base station 12. For example, consecutive numbers "10.16.111.101" to "10.16.111.116" are set as the addresses of the 16 micro base stations 12a which can process four channels per each radio base station 12, respectively, "10.17.123.122" is set as the address of the small base station 12b which can process 1,440 channels, and "10.17.123.123" is set as the address of the large base station 12c which can process 2,880 channels. That is, "10.16.XXX.XXX" is set as the IP address of each micro base station 12a, and "10.17.XXX.XXX" is set as the IP address of each of the other small base station 12b and large base station 12c. "XXX" is an arbitrary numeric value which ranges from "0" to "255." Such address information of each radio base station 12 is stored in the base-station-information storage unit 22 of the base station control apparatus 11. On the basis of the stored address information, the scale identifying unit 23 of the base station control apparatus 11 identifies the scale of each radio base station 12. That is, the scale identifying unit judges whether or not the IP address of a radio base station 12 is "10.16.XXX.XXX", and, when judging that the IP address of the radio base station 12 is "10.16.XXX.XXX", identifies that the radio base station 12 is a micro base station 12a, whereas, when judging that the IP address of the radio base station 12 is not "10.16.XXX.XXX", it identifies that the radio base station 12 is either the small base station 12b or the large base station 12c. Each radio base station 12 is controlled so as to carry out the process according to the identified base station scale information by the base station control unit 24 of the base station control apparatus 11 in the same way as in the case of using the base station type information.

However, because in the case of using the address information having an architecture according to the base station scale information the address information itself is also base station scale identification information while the address information itself is base station identification information, it is not necessary to store the address information while associating it with other base station identification information.

Next, a case in which the maximum transmission power of each radio base station 12 is used as the base station scale information will be explained. Information on the maximum transmission power of each radio base station 12 is transmitted from each radio base station 12 to the base station control apparatus 11, and is then stored in the base-station-information storage unit 22 of the base station control apparatus 11. On the basis of the stored maximum transmission power information, the scale identifying unit 23 identifies the scale of each radio base station 12. For example, assume that a radio base station 12 whose maximum transmission power is equal to or less than 125 mW is a micro base station 12a, and a radio base station 12 whose maximum transmission power is larger than 125 mW is either the small base station 12b or the large base station 12c. Each radio base station 12 is controlled so as to carry out the process according to the identified base station scale information by the base station control unit 24 of the base station control apparatus 11 in the same way as in the case of using the base station type information.

In addition, also when the service cell radius of each radio base station 12 is used as the base station scale information, each radio base station is controlled so as to carry out the process according to the identified base station scale information in the same way as in the case of using the maximum transmission power, and what is necessary is just to provide properly a service cell radius threshold for identifying the base station scale. Also when the total channel capacity of each radio base station 12 is used as the base station scale information, each radio base station is controlled so as to carry out the process according to the identified base station scale information in the same way as in the case of using the maximum transmission power, and what is necessary is just to provide properly a total channel capacity threshold for identifying the base station scale.

Next, the control of each radio base station 12 carried out by the base station control unit 24 will be explained in detail with reference to FIGS. 4 to 6.

FIG. 4 is a state diagram showing handover control according to the base station scale. When the mobile communication terminal 13 moves from the service area 20c of the large base station 12c (or the small base station 12b) to the service area 20a of a micro base station 12a, the base station control unit 24 of the base station control apparatus 11 instructs the micro base station 12a to which the mobile communication terminal moves and the mobile communication terminal 13 to perform a channel setup by using not a soft handover (SHO) but a hard handover (HHO). In communications between the micro base station 12a to which the mobile communication terminal moves and the mobile communication terminal, such the control is carried out even if the same frequency as that used by the large base station 12c from which the mobile communication terminal moves is used.

The service area 20c of the micro base station 12a can overlap the service area 20c of the large base station 12c partially, or can overlap the service area 20c totally. The state in which the service area of the micro base station overlaps the service area of the large base station totally means a state in which all of the service area 20a is included in the service area 20c.

FIG. 5 is a flow chart showing a flow of the handover control process. When, in step b1, the mobile communication terminal which is communicating with the large base station enters the service area of another base station, the mobile communication terminal, in the next step b2, judges whether or not the radio base station 12 corresponding to the new area is a micro base station 12a. When judging the radio base station corresponding to the new area is a micro base station 12a, the mobile communication terminal, in the next step b3, controls the micro base station 12a so as to make it carry out an HHO process. In contrast, when judging the radio base station corresponding to the new area is not a micro base station 12a, the mobile communication terminal, in step b4, controls the radio base station so as to make it carry out an SHO process.

FIG. 6 is a diagram showing a relation between handover and base station reception power. The horizontal axis of FIG. 6 shows the distance between the mobile communication terminal 13 and a radio base station 12, and the vertical axis of FIG. 6 shows the reception power of a signal received by the mobile communication terminal 13, which is transmitted from the radio base station 12. Reception power Pa shown in FIG. 6 is the reception power of a signal transmitted from a micro base station 12a, and reception power Pc is the reception power of a signal transmitted from the large base station 12c.

The mobile communication terminal 13 notifies the reception power of a signal transmitted from each radio base station 12 to the base station control apparatus 11 via each radio base station 12 at any time, and the base station control apparatus 11 carries out the handover control on the basis of the informed reception power at a timing as will be mentioned below. When the mobile communication terminal 13 approaches from the large base station 12c from which the mobile communication terminal moves to a micro base station 12a to which the mobile communication terminal moves, the reception power Pa of a signal received from the micro base station 12a which is the movement destination increases and the reception power Pc of a signal received from the large base station 12c which is the movement source decreases.

A location where the power difference which is a subtraction of the reception power Pc from the reception power Pa becomes equal to a power difference Pd1 is defined as a predetermined location L1. When the mobile communication terminal is staying at the location L1, if the radio base station 12 which is the movement destination is a micro base station 12a, the base station control apparatus 11 performs no control operation on the micro base station 12a and the mobile communication terminal 13. In contrast, when the radio base station 12 which is the movement destination is a base station other than micro base stations 12a, the base station control apparatus 11 carries out an SHO control operation of adding the micro base station 12a which is the movement destination as a base station with which the mobile communication terminal can communicate.

When the mobile communication terminal 13 further approaches a micro base station 12a which is the movement destination, the reception power Pa further increases and the reception power Pc further decreases. A location where the power difference which is a subtraction of the reception power Pa from the reception power Pc becomes equal to a power difference Pd2 is defined as a predetermined location L2. When the mobile communication terminal is staying at the location L2, if the radio base station 12 which is the movement destination is a micro base station 12a, the base station control apparatus 11 performs an HHO control operation on the micro base station 12a and the mobile communication terminal 13. In contrast, when the radio base station 12 which is the movement destination is a base station other than micro base stations 12a, the base station control apparatus 11 carries out an SHO control operation of deleting the large base station 12c which is the movement source from base stations with which the mobile communication terminal can communicate.

Thus, according to this embodiment 1, the base station control apparatus can carry out either an SHO control operation or an HHO control operation selectively according to the base station scale information. Therefore, a micro base station can reduce a search window width used for detecting the transmission path of a radio signal, and can therefore reduce its circuit scale.

Hereafter, the advantages of this embodiment 1 will be explained in detail with reference to FIGS. 7 to 10.

FIG. 7 is a timing chart showing detection of a path in a case in which the search window width is wide. It is necessary to, in order to detect a radio signal transmitted from the mobile communication terminal 13, detect the transmission path of this radio signal. Radio base stations 12 operate together at an asynchronous timing. That is, a signal transmitted in a downlink direction from each radio base station 12 to the mobile communication terminal 13 is asynchronous for each radio base station 12, and the head of radio frames in the signal is determined at a timing at which the power supply of each radio base station 12 is turned on. Furthermore, in the signal transmitted in a downlink direction, the head of each frame can be set up for every 256 chips in order to maintain the orthogonality of two or more spread codes. In addition, in a signal transmitted in an uplink direction, a time of +1,024 chips is set up as the head with respect to the timing of the downlink signal. The transmission timing of an uplink signal from the mobile communication terminal 13 to a radio base station 12 is once every 256 chips (1 chip≈0.26 microseconds), and the transmission path is detected at either of times corresponding to the 256 chips. At this time, at the time of performing the SHO control operation, in order to make both the radio base station (#1) 12 which is the movement source and the radio base station (#2) 12 which is the movement destination detect the transmission path of a signal from the mobile communication terminal 13, the search window width of the radio base station (#2) 12 which is the movement destination only has to be set to a relatively-wide one of W1=256 chips.

With this structure, the transmission path of a signal from the mobile communication terminal 13 can be detected at any timing. However, because a digital filter for calculating correlations consists of a timing window in which the transmission path can be detected, the number of taps of the digital filter becomes large as the search window width becomes wider and therefore the circuit scale also becomes large.

FIG. 8 is a timing chart showing the detection of the path in a case in which the search window width is narrow. When the search window width is set to a relatively-narrow one of W2=16 chips, the timing of the transmission path does not fall within the limits of the search window with the timing of the radio base station (#2) 12 which is the movement destination, and there is a case in which the transmission path cannot be detected. When the reception power of a signal from the radio base station (#2) 12 which is the movement destination becomes sufficiently larger than the reception power of a signal from the radio base station (#1) 12 which is the movement source, the mobile communication terminal 13 operates so as to set (the downlink timing of the radio base station (#2) 12 which is the movement destination+1,024 chips) as the head of radio frames.

However, the timing can be changed by only 1/8 chips every 200 ms. Therefore, if the reception power of a signal received from the radio base station (#2) 12 which is the movement destination becomes sufficiently larger than the reception power of a signal received from the radio base station (#1) 12 which is the movement source, the transmission path approaches the search window gradually. However, in the case of the SHO control operation, because the transmission path approaches the search window by 1/8 chips every 200 ms, it takes some time before the transmission path enters the search window and path detection is carried out.

FIG. 9 is a timing chart showing the time which has elapsed until path detection using SHO is carried out. Hereafter, assume that the uplink path has a timing which is apart from the search window of the radio base station 12 by 50 chips. In the case of the SHO control operation, because the transmission path approaches the search window by 1/8 chips every 200 ms, 200 ms×(50 chips/(1/8 chips))=200 ms×400=80,000 ms=80 seconds has elapsed until the transmission path enters the search window. This means that 80 seconds has elapsed until the radio base station 12 which is the movement destination enters a state in which it can communicate with the mobile communication terminal. This results in the difficulty in carrying out a handover smoothly.

FIG. 10 is a timing chart showing the time which has elapsed until path detection using HHO is carried out. If an HHO control operation is carried out when the search window width is relatively small, the search window can be adjusted so that the transmission path enters the search window immediately. Therefore, if the base station control apparatus 11 carries out control so as to perform an HHO control operation, the search window can be made small, and, as a result, the scale of a circuit for carrying out the path search can be made small. Therefore, each radio base station 12 can be downsized and can be made to fall in price.

As shown in FIGS. 1 and 2, the base station control apparatus 11 provides notification of a request to provide the base station scale information thereto to each radio base station 12, and each radio base station 12 informs, as a response to the request, the base station scale information to the base station control apparatus 11. This embodiment is not limited to this example. For example, without the base station control apparatus 11 making a request to transmit the base station scale information of each radio base station 12, each radio base station 12 can notify the base station scale information thereof to the base station control apparatus 11 at the time when started. This structure also makes it possible for the base station control apparatus to identify the scale of each radio base station 12.

As an alternative, an example shown in FIG. 11 can be provided.

FIG. 11 is a diagram showing a procedure for acquiring the base station scale information by way of a scale information server. In the structure of FIG. 11, the scale information server 14 is disposed in addition to the components of the mobile communications system of FIG. 1 (the mobile communication terminal 13 is not shown in FIG. 11). The scale information server 14 is a server for acquiring the base station scale information on each radio base station 12, and is constructed of, for example, an operation system and so on.

In the structure of FIG. 11, when a radio base station 12 starts, the scale information server 14, in step c1, makes a request of the radio base station 12 to transmit its base station scale information thereto. The radio base station 12, in the next step c2, informs, as a response to the request, the base station scale information to the scale information server 14. According to this procedure, the scale information server can acquire the base station scale information from each radio base station 12.

Next, in step c3, the base station control apparatus 11 makes a request of the scale information server 14 to provide the base station scale information thereto. The scale information server 14, in the next step c4, notifies, as a response to the request, the base station scale information to the base station control apparatus 11.

With this structure and the procedure, the base station control apparatus can identify the scale of each radio base station 12.

In the example of FIG. 11, the timing at which the base station control apparatus 11 makes a request of the scale information server 14 to provide the base station scale information thereto is set so that it comes after the radio base station 12 has informed the base station scale information to the scale information server 14. This embodiment is not limited to this example. For example, when no base station scale information can be provided from the scale information server 14 to the base station control apparatus 11 in response to a request from the base station control apparatus 11, the base station control apparatus can make a request of the scale information server 14 to provide the base station scale information thereto again after a certain time interval has elapsed and can repeatedly make this request until it receives the base station scale information.

Embodiment 2

A base station control apparatus according to this embodiment 2 carries out a compressed mode control operation instead of the handover control operation as shown in embodiment 1. When the scale identifying unit 23 of the base station control apparatus 11 identifies that the radio base station 12 is a micro base station 12a, the base station control unit 24 of the base station control apparatus 11 carries out a control operation of fixing parameters (a gap location, a gap length, etc.) about compressed mode.

FIG. 12 is a diagram showing a structure intended for the channel coding of a micro base station. A memory 31 is a memory for temporarily storing data which are yet to be channel-coded. A memory 32 is a memory for temporarily storing radio frame data on which the channel coding process has been performed. At the time when the micro base station operates in the compressed mode, a data pattern in which parameters, such as a gap location and a gap length, are fixed is stored. Each data stored in the memory 32 can have a ternary value: +1, 0, or −1. A counter 33 is a counter for furnishing its count value to an address generation unit 34. The count value outputted from the counter 33 is inputted to the address generation unit 34, and a combination of an address of the memory 31 and an address of a memory 35 is decided. The address generation unit 34 converts the count value into an address value of the memory 35 on the basis of control information about the inputted data. The control information inputted to the address generation unit 34 is a TFCI (Transport Format Combination Indicator), or a gap location or a gap length in the compressed mode. The memory 35 stores information about radio frame data of all services and all patterns which each radio base station 12 supports. The description of the stored information is an address of the memory 32. All the patterns are the ones having gap locations or gap lengths in all TFCIs and in the compressed mode. A level conversion unit 36 converts binary data of 0 or 1 into ternary data of +1, 0, or −1. A converting method is controlled by the address generation unit 34.

Next, the operation of the base station control apparatus in accordance with this embodiment will be explained.

The base station control apparatus 11 transmits downlink transmission data and information about the downlink transmission data to a radio base station 12. The information about the downlink transmission data includes service information about sound and packets, TFCI, and a gap location and a gap length in the compressed mode. The transmission data are stored in the memory 31 after error-correction-coded. The information about the downlink transmission data is stored in the address generation unit 34. The counter 33 starts its counting operation when the data are stored in the memory 31, and outputs a generated count value to both the memory 31 and the address generation unit 34. When receiving the count value from the counter 33, the memory 31 reads the data stored in the memory 31 from a certain address in the memory 31 in the order according to the count value. The binary data read out of the memory are converted into ternary data (+1, 0, −1) by a ternarizing unit 36, and are then store in the memory 32. In this case, the location where the ternary data are stored in the memory 32 is based on the address information informed from the memory 35 to the memory 32. The address generation unit 34 generates address information about an address of the memory 35 of the basis of the control information about the data informed from the base station control apparatus 11 and the count value inputted from the counter 33, and delivers the address information to the memory 35. Results of the channel coding in all cases of specific services which the radio base station 12 supports, specific TFCIs, and specific gap sets are stored in the memory 35. The specific services include, for example, only services with a voice (Voice AMR (Advanced Multi Rate)+DCCH (Dedicated Control Channel)), and a packet transmission rate of 384 kbps (PS384 (PS: Packet Service)+DCCH).

FIG. 13 is a diagram showing an array of data stored in the memory 32. From this data array, which transport channel bit number Ntcb is selected, which TFCI is selected, which gap set is selected, and which service (channel type C) is selected are determined by the address generation unit 34 by specifying an address Ad of the memory 35. According to the address value specified by the address generation unit 34, the memory 35 reads data from the memory 35 and delivers them to the memory 32. The description of the data shows the destination of the error-correction-coded data bits in the results of the channel coding, and has the form of a storing address location of the memory 32.

Furthermore, as to bits whose number increases or decreases because of rate matching, DTX (Discontinuous Transmission) addition, or the like, the address generation unit 34, when the bit number increases, performs an operation of generating addresses of two or more memories 35 for one count value, and delivering them to the memories 35. In contrast, when the bit number increases, even after the reading of data from the memory 31 is completed, data which specifies +1, 0, or −1 for an address showing a blank area of the memory 32 is delivered from the memory 35 to the memory 32. As an alternative, the address generation unit 34 sends a wait signal to the counter 33 so as to make the counter stop its counting operation during a time interval corresponding to a repetition bit number while giving an instruction having a value of +1, 0, or −1 from the memory 35 to the memory 32.

FIG. 14 is a diagram showing a first example of the channel coding. FIG. 14 shows an example of the channel coding in a compressed mode pattern of VoiceAMR+DCCH, TFCI=5, TGPL1=TGPL2=4 frames, TGL1=3 slots, and TGL2=4 slots (TGL: Transmission Gap Length). Data which are error-correction-coded in FIG. 14 (shown on an upper side of FIG. 14) are stored in the memory 31 of FIG. 12, and data of a radio channel format of FIG. 14 (shown on an upper side of FIG. 14) are stored in the memory 32 of FIG. 12. An error correction is made only to convolutional codes, the gap location is fixed, and the TTI (Transmission Time Interval) of a transport channel which is a maximum among the TTIs of transport channels in the service is made to be equal to the TGPL (Transmission Gap Pattern Length). Several mapping locations whose number is equal to the number of TFCSs (Transport Format Combination Sets) exist for every service. By storing in the memory 35 addresses which specify the mapping locations, a channel-coding operational circuit can be greatly reduced in size. It is desirable that the TGPL is equal to the TTI, or the least common multiple of the TGPL and the TTI is small.

Thereby, each micro base station 12a sets the transmission gap length to a fixed length in the compressed mode and carries out a fixed process of performing only channel coding in a specific pattern, and a small base station 12b and a large base station 12c other than micro base stations set the transmission gap length to a fixed length in the compressed mode. As a result, the circuit scale of each micro base station 12a can be reduced. Furthermore, if only the mapping locations whose number is equal to the number of TFCSs are specified for each service by fixing the gap location and by making the maximum TTI among the TTIs of transport channels in the service be equal to the TGPL, the channel-coding operational circuit can be greatly reduced in size.

The advantages provided by this embodiment will be explained concretely with reference to FIGS. 15 to 17.

FIG. 15 is a diagram showing a second example of the channel coding. In this figure, a case in which in a service of VoiceAMR+DCCH, the pattern gap (TGPL1, 2) in the compressed mode (the gap location is fixed) is TGPL1=TGPL2=5, and differs from the value (=4) which is 1/10 of the maximum TTI (the maximum TTI=40 ms among those of Classes A, B, C, and DCCH) is shown. In such a case, until the time reaches 200 ms which is the least common multiple of the maximum TTI=40 ms and TGPL1 (=TGPL2) =5, the gap location does not become equal to the gap location at the beginning. It is therefore clear that some addresses of the memory 32, which are the equivalent of 200 ms, must be stored in the memory 35 of FIG. 12. Furthermore, it is clear that when the gap location is not fixed, any address of the radio frame data including a compressed mode pattern cannot be stored.

FIG. 16 is a diagram showing a third example of the channel coding. In the figure, a case in which in a service of VoiceAMR+DCCH, the pattern gap TGPL in the compressed mode (the gap location is fixed) is an even number is shown. For example, in a case of TGPL1=TGPL2=8, it is clear that some addresses of the memory 32, which are the equivalent of two maximum TTIs, i.e., 80 ms, must be stored in the memory 35 of FIG. 12.

FIG. 17 is a diagram showing a fourth example of the channel coding. In the figure, a case in which the value (=4) which is 1/10 of the maximum TTI is the same as the TGPL1 (=TGPL2=4) is shown. In this case, it is clear that only addresses of the memory 32, which are the equivalent of one maximum TTI, i.e., 40 ms, must be stored in the memory 35 of FIG. 12.

Thus, it is clear that if there is regularity of the constraints on the gap pattern in the compressed mode, the memory size of each base station can be reduced. If the target base station is a micro base station having a user accommodation number of 4 and intended for, for example, home use, no problem arises even if the gap pattern is fixed as mentioned above.

In addition, in FIG. 12, when radio frame data which are channel-coded are written in the memory 32, they are written in the memory 32 while they are channel-coded according to the compressed mode by specifying addresses of the memory 32 (the structure shown in FIG. 12 is referred to as the first example from here on). However, this embodiment is not limited to this example.

FIG. 18 is a diagram showing a second example of the structure intended for the channel coding of the micro base station. The micro base station is so constructed as to, when reading error-correction-coded data from the memory 31, read them with addresses having the bit order of radio frame data which have been channel-coded according to the compressed mode. When writing data in the memory 32, the micro base station has only to sequentially write them in the memory from a start address. However, in a case in which repetition is carried out in a rate matching process, when reading data from the memory 31, the micro base station additionally carries out a process of reading a value at the same address. Because processes of the micro base station other than the above-mentioned process are almost the same as those in the case of FIG. 12, the explanation of the processes will be omitted hereafter.

In addition, the memory 35 can notify a part on which a repetition bit operation is to be performed to the ternarizing unit 36, so that the ternarizing unit 36 can carry out repetition. Furthermore, when the memory 35 reads data from the memory 31, the micro base station can read the same address of the memory 31 by taking the repetition into consideration. In the meantime, the counter interrupts its counting (i.e., waits).

FIG. 19 is a diagram showing an example of a structure intended for the channel decoding of the micro base station. A memory 41 stores data which are yet to be error-correction-decoded. A memory 42 stores radio frame data which are yet to be channel-decoded. Data stored is a soft value, for example, is +32, −15, or the like. In this data, the sign of "+" or "−" shows a decision value, and the absolute value of "32" or "15" shows reliability information. In addition to a soft value which is delivered from a demodulating unit and which has been de-spread and path-synthesized, a value which is used for repetition at the time of the channel decoding is prepared separately. The value prepared separately is a soft value of the lowest reliability, i.e., ±0. A counter 43 is a counter for starting its counting operation when data is stored in the memory 42. An address generation unit 44 specifies which part of the address information stored in the memory 42 must be read on the basis of the control information on the data and TFCI information from a demodulating unit when receiving a count value from the counter 43. A memory 45 stores the address information which specifies the addresses of the memory 41, at which the yet-to-be-channel-decoded data are stored, in the channel decoding. In a case of data on which the mobile communication terminal 13 has performed repetition at the time of transmission of the data, an adder unit 46 carries out a process of adding a repetition bit on which the radio base station 12 has performed repetition when carrying out a rate dematching process during the channel decoding at the time of reception of the data to an original bit. Information indicating which bit is a repetition bit is delivered to the adder unit by the memory 45.

Next, the channel decoding process will be explained.

When radio frame data are stored in the memory 42, the counter 43 operates and sends its count value to the memory 41 and the address generation unit 44. The count value sent to memory 41 specifies a write-in address at which data added by the adder unit 46 are started to be sequentially written in units of one value (i.e., one soft value) from a head location of the memory. The address generation unit 44 converts the count value sent thereto into an address of the memory 45 from which the data stored in the memory 42 are to be read. In order to specify the address of the memory 45, the address generation unit 44 refers to the control information on the data and the TFCI information from the demodulating unit. The TFCI information is information which is acquired from the received data when the demodulating unit carries out de-spreading and path synthesis of the data. When acquiring the address value of the memory 45 from the address generation unit 44, the memory 45 reads a value stored at the address and sends it to the memory 42. The data stored in the memory 45 are address values of the memory 42, and the order of the yet-to-be-channel-decoded data is the same as that of the addresses of the memory 42. Soft decision data stored in the memory 42 are read out on the basis of the order specified by the memory 45. The read data are inputted to the adder unit 46. If the received data stored in the memory 42 are data on which repetition has been performed when transmitted from the mobile communication terminal 13, the adder unit adds the repetition bit to the original bit. If the received data stored in the memory 42 are data on which puncturing has been performed when transmitted from the mobile communication terminal 13, the adder unit reads the fixed value (±0) of the reliability 0 stored in the memory 42 and sends it to the memory 41. The output data of the adder unit 46 are stored in the memory 41 in the order that the count value is counted up by the counter 43. The counter performs its counting-up operation in such a manner that the count value shows the first address value of the memory 41 first, the next address value, the further-next address value, and . . . .

In addition, when the data stored in the memory 42 are data on which puncturing has been performed by the mobile communication terminal 13, the address generation unit 44 carries out a control operation (wait) of interrupting the counting operation of the counter 43 during a time interval corresponding to the number of bits on which puncturing has been performed after reading the bits on which puncturing has been performed.

Embodiment 3

A base station control apparatus according to this embodiment 3 carries out a transmission power control operation instead of the handover control operation as shown in embodiment 1. When the scale identifying unit 23 of the base station control apparatus 11 identifies that the radio base station 12 is a micro base station 12a, the base station control unit 24 of the base station control apparatus 11 performs a control operation about the transmission power control on the radio base station 12.

Concretely, the base station control unit carries out the following processes (1) to (4).

(1) The process of changing the transmission-power-control cycle according to the scale of the base station.

(2) The process of changing a transmission power step size (i.e., the amount of change which can be made to the transmission power at a time within the limits of certain transmission power) according to the scale of the base station.

(3) The process of changing the priority of interrupt processing about the transmission power control according to the scale of the base station (e.g., if the base station is a micro base station, a certain amount of control delay can be permitted).

(4) The process of carrying out transmission power control for each channel or carrying out transmission power control collectively for all channels according to the scale of the base station.

FIG. 20 is a diagram showing a structure intended for the transmission power control of the radio base station. In FIG. 20, a structure for controlling uplink transmission power of the radio base station is shown. The radio base station is, for example, a base station according to the W-CDMA standard. A de-spreading/path synthesis unit 61 carries out de-spreading of a received signal spread, and carries out path synthesis based on RAKE synthesis. When the radio base station carries out channel decoding and so on, a quality measurement unit 62 calculates a BLER (Block Error Rate) on the basis of the number of NGs of CRC (Cyclic Redundancy Check) of a transport channel, or measures the quality by calculating a BER (Bit Error Rate) by counting a number of bit positions at which data on which channel coding has been performed again at the time when the error correction is performed are different from the yet-to-be-error-corrected data. As an alternative, by using a method of counting the number of errors in pilot bits which are a known sequence, the quality measurement unit can measure the quality. A quality comparison unit 63 compares the result from the quality measurement unit 62, such as the BER or BLER, with a target value, such as a target BER or BLER. A target quality notifying unit 64 notifies the target BER or BLER quality to the comparison judgment circuit 63. A target SIR setting unit 65 sets up an SIR of an uplink signal which is a target in response to a comparison judgment result. An SIR measuring unit 66 measures the SIR of the received signal (i.e., a ratio of the signal power and the interference power, or a ratio of the signal amplitude and the interference amplitude). An SIR comparison unit 67 compares the SIR of the received signal with the SIR of the uplink signal which is the target. A pattern selecting unit 68 selects a TPC bit pattern of 10 msec on the basis of the comparison result, and notifies it to a transmitting unit.

Next, the process (1) among the processes (1) to (4) in accordance with this embodiment 3 will be explained in detail.

The de-spreading/path synthesis unit 61 carries out de-spreading and path synthesis of the spread signal received from the mobile communication terminal, which the base station has received. The path-synthesized data are sent to both the SIR measuring unit 66 and the quality measurement unit 62. The quality measurement unit 62 calculates a BLER from the channel-decoded result for which it has been judged whether CRC shows OK or NG, and notifies the calculation result to the quality comparison unit 63. As an alternative, the quality measurement unit can carry out channel coding of the data to which an error correction has been made again at the time of the channel decoding, and compares the channel-coded data with the yet-to-be-error-corrected data so as to calculate a BER, and can notify the calculation result to the quality comparison unit 63. The quality comparison unit 63 compares the calculation result with the target quality BER or BLER, and determines the target SIR by using a table having a correspondence between the difference between them and an SIR setting which can be the target. The SIR measuring unit 66 calculates the SIR of the de-spread and path-synthesized received data. As an alternative, before carrying out the path synthesis, the SIR measuring unit can calculate an SIR for each path and synthesize the SIRs of paths so as to calculate the SIR of the de-spread and path-synthesized received data. The SIR comparison unit 67 compares the calculated SIR with the target SIR so as to determine a pattern of TPC bits of 10 ms according to the difference between them. 10 ms can be decided as an example for the reason that no degradation of the performance is found in very-narrow closed space, such as at home, even if the cycle of the transmission power control is lengthened.

FIG. 21 is a diagram showing TPC bit patterns. The TPC bit patterns are stored in the table. For example, when a 2-bit TPC bit pattern exists in one slot, "11" means that the mobile communication terminal 13 is instructed to raise the uplink transmission power by +1 dB, and "00" means that the mobile communication terminal 13 is instructed to reduce the uplink transmission power by 1 dB. After a TPC bit pattern is notified to the transmitting unit, it is transmitted in units of one slot (i.e., in units of 2 bits).

If the amount of change in the SIR is about +1 dB per 10 ms, it has not so much influence upon the change in the transmission power even if the SIR is varied at any timing during the time interval of 10 ms, though if the power change reaches a range from 3 dB to 7 dB, it is necessary to prepare two TPC bit patterns: a TPC bit pattern which varies rapidly during the time interval of 10 ms, and a TPC bit pattern which varies gently during the time interval of 10 ms. In FIG. 21, among the TPC bit patterns which respectively correspond to each of the power ratios 3 dB and 7 dB, the TPC bit pattern shown on the upper side is the pattern for changing the power relatively suddenly, and the TPC bit pattern shown on the lower side is the pattern for changing the power relatively gently. The reason why both the patterns are prepared is that when the power is varied rapidly, the interference to another user also varies rapidly, and, if the other user is carrying out transmission power control in a cycle of 10 ms, it becomes impossible for the speed at which the other user suppresses the interference to catch up the rapid variation in the interference. It is therefore necessary to change the power slowly at the time when multiple users are using the radio base station, and hence the TPC bit pattern which changes the power slowly is needed. Furthermore, rapid change in the power causes rapid increase in the interference to other cells, though in a case in which only one user's communications are carried out in a service area of an identical small base station 12a in closed space intended for, for example, home use, such rapid change in the power does not matter in principle.

An example of the operation of the small base station 12a in a case in which only one user's communications are carried out in the service area of the same small base station 12a will be explained hereafter. When the amount of change in the SIR per 10 ms of the uplink signal from the mobile communication terminal 13 decreases by 3 [dB] with respect to the target SIR (set to 65 of FIG. 20), the small base station 12a selects the TPC bit pattern shown on the upper side of the row of FIG. 21 corresponding to the power ratio 3 dB, and transmits data according to the pattern to the mobile communication terminal 13. The data is a request to raise the transmission power by 3 [dB] which is issued to the mobile communication terminal 13. When the amount of change in the SIR per 10 ms of the uplink signal from the mobile communication terminal 13 decreases by 7 [dB] with respect to the target SIR (set to 65 of FIG. 20), the small base station 12a selects the TPC bit pattern shown on the upper side of the row of FIG. 21 corresponding to the power ratio 7 dB, and transmits data according to the pattern to the mobile communication terminal 13.

An example of the operation of the small base station in a case in which many users communications are carried out in the service area of the same small base station 12a will be explained hereafter. When the amount of change in the SIR per 10 ms of the uplink signal from the mobile communication terminal 13 decreases by 3 [dB] with respect to the target SIR (set to 65 of FIG. 20), the small base station 12a selects the TPC bit pattern shown on the lower side of the row of FIG. 21 corresponding to the power ratio 3 dB, and transmits data according to the pattern to the mobile communication terminal 13. When the amount of change in the SIR per 10 ms of the uplink signal from the mobile communication terminal 13 decreases by 7 [dB] with respect to the target SIR (set to 65 of FIG. 20), the small base station 12a selects the TPC bit pattern shown on the lower side of the row of FIG. 21 corresponding to the power ratio 7 dB, and transmits data according to the pattern to the mobile communication terminal 13.

As a result, while, conventionally, an SIR measurement, a comparison with the target SIR, and generation of TPC bits are processed in units of 1 slot (0.667 ms), according to the present invention, they can be processed in units of 10 ms (i.e., in units of one frame). Because even in this case, the transmission power control can be carried out according to a pattern which is close to that of the prior art transmission power control carried out for every slot, the degradation of the performance can be prevented. By selecting, as the control cycle, either of the patterns of FIG. 21 for every frame (i.e., every 10 ms), the degradation of the power performance can be prevented even when the power control is performed every 10 ms (i.e., for every frame). Because the processing for every slot can be carried out for every frame while the degradation of the performance is prevented, the processing can be simplified.

Furthermore, for example, in accordance with the W-CDMA standard, in both the uplink transmission power control and the downlink transmission power control, the transmission power control of a closed loop (an inner loop) is performed at such a high speed as 0.667 ms. This is because the transmission power can be adjusted to optimal one immediately even when the mobile communication terminal 13 moves away quickly from a radio base station 12 or approaches quickly to a radio base station 12. On the other hand, because a user who is communicating in the service area of a micro base station 12a is standing still in indoor closed space, the micro base station does not have to carry out high-speed control as mentioned above. Because the amount of controlled transmission power variable per time can be reduced when the transmission power control is carried out during a longer time period of several ms, the circuit scale can be reduced.

Furthermore, in FIG. 21, although each TPC bit pattern shown is an example having a duration of 10 ms (one frame=15 slots), it is possible to optimize the duration according to the movement speed and transmission frequency of the target mobile communication terminal. For example, when the movement speed or transmission frequency of the target mobile communication terminal is high, TPC bit patterns each having several slots (several ms) can be prepared so that the transmission power control can be carried out for every several slots. Furthermore, as shown in FIG. 20, the method of averaging the SIR estimated value in each transmission-power-control cycle is explained as an example, though a method of using the SIR estimated value measured at the last slot in a transmission-power-control cycle unit can be provided as another example and can also be effectively used. The method of averaging the SIR estimated value in each transmission-power-control cycle is effective for a case in which there is a large change in the transmission environment due to movements of the target mobile communication terminal, and for a case in which interference from other moving equipment occurs in burst because the reliability of the SIR estimated value is improved by the averaging. The method of using the SIR estimated value measured at the last slot in a transmission-power-control cycle unit is effective for a case in which the reliability of the SIR estimation for one slot is high because the time which has elapsed until the transmission control is reflected in the transmission power in the inner loop is shortened. Furthermore, in the above-mentioned example, a pattern is set up according to the table value (FIG. 21) showing the difference between the target SIR and the SIR estimated value which is based on the received data, as previously explained. In this example, when the SIR estimation accuracy is low, it is effective to multiply the difference between the target SIR and the SIR estimated value which is based on the received data by a multiplier a ($0<\alpha<1$). The multiplier $\alpha$ is determined separately by experiment or the like.

Next, the process (2) among the processes (1) to (4) in accordance with this embodiment 3 will be explained in detail.

FIG. 22 is a diagram showing a structure intended for the transmission-power correction of the radio base station. FIG. 22 shows a structure intended for the downlink transmission power control. A spreading unit 71 carries out spectrum spread of transmission data using a spread code of CDMA. A power controller 72 sets up an amplitude value (or a power value) of the spread transmission data. A de-spreading/path synthesis unit 73 carries out de-spreading of spread data received from a mobile communication terminal 13, and carries out path synthesis. A transmission-power correction generating unit 74 is a circuit for accepting a TPC bit among the received data which have been de-spread and path-synthesized, and for generating a transmission-power correction value on the basis of a step size with which the amount of transmission-power increase or decrease (dB) which is made to the transmission power at a time can be changed. The step size is selected according to base station scale information.

Next, an operation related to FIG. 22 will be explained.

A spread signal (received data) which the radio base station has received from the mobile communication terminal 13 is de-spread and path-synthesized, and its TPC bits are then sent to the transmission-power correction generating unit 74. The transmission-power correction generating unit 74 adds a transmission-power increase or decrease instruction having a duration of 10 ms, which consists of TPC bits, to the received TPC bits, further generates a value which is used for correcting a transmission power value in each slot according to information on the step size every 10 ms, and notifies it to the power controller 72 which controls the transmission power of transmission data. The transmission data is multiplied by a spread code by the spreading unit 71 so that it becomes a transmission spread signal, and this signal is then sent to the power controller 72. The power controller 72 sets up an amplitude value (or a power value) of data on the basis of the transmission-power correction value. The setting is changed every 10 ms. The transmission spread signal having the set-up amplitude value (or power value) is sent to a D/A converter.

The step size which is the amount of change of the transmission power by which the transmission power can be changed at a time, for example, the amount of change [dB] by which the transmission power can be changed per one [slot] can be varied according to the base station scale information. For example, assuming that the step size is set to 1 [dB] which is relatively small, the performance of the transmission power control degrades remarkably when the base station sets the cycle of the downlink transmission-power setting to one frame (10 ms), even though the cycle of receiving the downlink transmission power control instruction from the mobile communication terminal 13 (i.e., the cycle of changing uplink TPC bits) is one slot. However, if the step size is set to 3 [dB] which is relatively large, as long as the user uses the mobile communication terminal 13 in narrow space like at home, the performance of the transmission power control does not degrade.

FIG. 23 is a diagram showing the transmission power in a case in which the transmission-power step size is small. In FIG. 23, the transmission-power step size is set to 1 [dB], and the cycle of the transmission-power setting is set to 1 [slot]

FIG. 24 is a diagram showing the transmission power in a case in which the transmission-power step size is large. In FIG. 24, the transmission-power step size is set to 3 [dB], and the cycle of the transmission-power setting is set to 3 [slot]. It is clear that setting the step size to 3 [dB] larger than 1 [dB] can reduce any decrease in the accuracy of the transmission-power setting even if the cycle of the transmission-power setting is set to be longer than 1 [slot]. If the cycle of the transmission-power setting is set to 3 [slot] longer than 1 [slot] while the step size is set to 1 [dB], the same transmission-power setting is not made at the time of 6 [slot], as shown in FIG. 23. Furthermore, in the above-mentioned example, the downlink transmission power value corresponding to the TPC bit value accumulated during the cycle of the transmission-power-control instruction transmitted from the mobile communication terminal is explained. However, because there is a time difference, the accumulated value does not necessarily become equal to the transmission power which the moving equipment needs. For this reason, it is effective to multiply the TPC bit value accumulated during the cycle of the transmission-power-control instruction by a multiplier a (0<α<1). The multiplier α is determined separately by experiment or the like.

Next, the process (3) among the processes (1) to (4) in accordance with this embodiment 3 will be explained in detail.

In accordance with the W-CDMA standard, the cycle of the uplink transmission power control with TPC bits which the radio base station generates is one slot (0.667 ms), and variations in the radio transmission line between the mobile communication terminal and the radio base station have to be handled as soon as possible. Therefore, in FIG. 20, the radio base station carries out the control process of measuring the SIR, comparing it with the target SIR, and generating TPC bits with a higher priority. However, in the service area of a micro base station, in which the transmission line state hardly varies, the service area being located in closed space such as the interior of a house or an elevator, almost no degradation of the performance is found even if the priority of the control process is lowered so that some control delay can be permitted.

As a result, for example, when the transmission power control process is incorporated into the radio base station using a control device, such as a DSP (Digital Signal Processor), which uses a task interrupt, priority interrupts about TPC can be eliminated. This provides an advantage of moving processing data to an evacuation memory for interrupts by using the DSP, and reducing the processing load for returning the processing data and eliminating complicated management of variables in consideration of multiple interrupts.

Next, the process (1) among the processes (1) to (4) in accordance with this embodiment 3 will be explained in detail.

FIG. 25 is a diagram showing Δoffset. Two frames show radio transmission time intervals during which transmission data are transmitted to the radio base station via two user channels with different timings, respectively. The difference between the timings is called Δoffset.

FIG. 26 is a diagram showing the transmission power control for each channel. FIG. 26 is an enlarged diagram of a part of Δoffset shown in FIG. 25. When the transmission power control is carried out individually for each user channel, the transmission power control is started at a slot's head for each user channel. The downlink transmission power control is carried out on the basis of TPC bits from the mobile communication terminal 13, is started at the head of a slot, and this downlink transmission power control is reflected promptly in the transmission data. Thus, when the transmission power control is carried out individually for each user channel, the time which has elapsed until the transmission power control is reflected in the transmission data after the control is started can be shortened, and the transmission power control can be carried out with high performance. On the other hand, because the mobile communication terminal does not move at a high speed in a very-small service area which covers the inside of a house, an elevator, or the like, no degradation of the performance is found even if such high-speed control is not implemented.

FIG. 27 is a diagram showing the transmission power control which is carried out collectively for all channels. The base station carries out the transmission power control collectively for all the user channels by making the start timing of the transmission power control for each user channel be the same. For example, the base station uses the control timing T1 in the slot head of the user channel #1 also for the user channel #2. As a result, the control of the user channel #2 is reflected at the expiration of two slots after the setting. Although a time interval of one slot has elapsed until the control of the user channel #2 is reflected since the setting, the performance does not degrade in such a case that the user hardly moves in a very-small service area.

Furthermore, because on the basis of head position timing information on a slot or a frame, the time which has elapsed until the control of the user channel #2 is reflected after the control is started can be grasped, only setting up only the control timing collectively for all the user channels can automatically make the setting of the transmission power be reflected in the next frame from the head position of the next frame.

Thus, by carrying out timing control which is common to a plurality of channels, the base station can eliminate, for example, the complicated control process of, while controlling the user channel #1, starting the control of the user channel #2 and assigning a certain priority to the interrupt processing. For example, the number of times that switching among tasks about the transmission-power processing of DSP is done can be decreased. Furthermore, also in the case of FPGA, the scale of a circuit used for timing generation can be reduced.

Embodiment 4

A base station control apparatus according to this embodiment 4 carries out a transmission timing control operation for channels instead of the handover control operation as shown in embodiment 1. When the scale identifying unit 23 of the base station control apparatus 11 identifies that the radio base station 12 is a micro base station 12a, the base station control unit 24 of the base station control apparatus 11 carries out control about the transmission timing of a channel for the radio base station 12. For example, when the scale identifying unit identifies that the radio base station is a micro base station 12a, the base station control unit carries out a control operation of synchronizing the transmission timing of a dedicated channel with the transmission timing of a common channel.

The timing of a physical channel is defined in Chapter 7 of 3GPP TS25.211 (3GPP: 3rd Generation Partnership Project, TS: Technical Specification) of the specifications which define the WCDMA standard.

FIG. 28 is a diagram showing the timing of a dedicated channel and the timings of common channels. The timing of S-CCPCH (Secondary Common Control Physical Channel) deviates from that of P-CCPCH (Primary Common Control Physical Channel) by Tk×256 chips, and the timing of DPCH (Dedicated Physical Channel) deviates from that of P-CCPCH by Tn×256 chips. As each of Tk and Tn, 0, 1, - - - , or 149 can be set by the base station control apparatus 11 disposed on an upper side of the system. The base station control apparatus 11 sets both of Tk and Tn to 0 when identifying that the radio base station connected thereto and disposed on a lower side is a micro base station.

FIG. 29 is a diagram showing a case in which the timing difference among the channels is set to zero. Both of S-CCPCH and DPCH has the same timing as P-CCPCH. The micro base station has only to process the above-mentioned three types of channels at the same timing. As a result, the micro base station can carry out the control process of controlling the above-mentioned three types of channels using only one interrupt signal instead of three types of interrupt signals.

FIG. 30 is a diagram showing the processing load at the time of synchronizing the timings of all the channels with one another. Processing each channel at the same timing means that times when the processing loads about the channels become large overlap one another, as shown in FIG. 30. The time which is the sum of a delay time which occurs when the channel shown at the highest position of the figure is actually processed, a delay time which occurs when the channel shown at the second highest position of the figure is actually processed, and a delay time which occurs when the channel shown at the lowest position of the figure is actually processed is a maximum delay time. The maximum delay time becomes longer as the number of channels increases. In a case in which the radio base station has about four voice channels, as in the case of a micro base station, the delay time is short. Furthermore, in this case, interrupt has only to be performed only one time.

FIG. 31 is a diagram showing the processing load at the time when the timings of the channels are made to deviate from one another. If the timings of the above-mentioned three types of channels are made to deviate from one another as shown in FIG. 28 (for example, if they are made to deviate from one another so that the processing loads about the channels can be distributed most evenly), the flow of the processing load about each channel is as shown in FIG. 31. In FIG. 31, because only a number of times that interrupt is performed, which is the equivalent of the number of channels, is needed and the times when the processing loads about the channels rise to their maximums, respectively, are prevented from overlapping one another, a delay time which occurs at the time when the processing is actually performed becomes less than that in the case of FIG. 30. However, the whole throughput increases as compared with the case of FIG. 30. The reason why the whole throughput increases is given as follows.

For example, after receiving an interrupt request about the channel shown at the highest position of the figure, the base station control apparatus processes the channel shown at the highest position of the figure, and, when then receiving an interrupt request about the channel shown at the second highest position of the figure, deletes the DPCH which is the highest position of the figure, and issues a sequence of changing the timing. Also when receiving an interrupt request about the channel shown at the lowest position of the figure, the base station control apparatus similarly has to delete the DPCH which is the second highest position of the figure, and issue a sequence of changing the timing.

Thus, a micro base station performs a control operation of reducing the number of times that interrupt is performed, as shown in FIG. 30, thereby simplifying the data processing. Therefore, the present embodiment offers an advantage of being able to reduce the throughput and circuit scale of a micro base station. Particularly, in a case in which the control operation is performed by using a DSP (Digital Signal Processor), the number of times that interrupt is performed can be reduced and the task management can be simplified if the timing is fixed.

Embodiment 5

A base station control apparatus according to this embodiment 5 carries out a transmission timing control operation for channels instead of the handover control operation as shown in embodiment 1. When the scale identifying unit 23 of the base station control apparatus 11 identifies that the radio base station 12 is a micro base station 12a, the base station control unit 24 of the base station control apparatus 11 carries out a control operation of making the radio base station 12 carry out the same error correction coding as that done on a common channel.

For example, in accordance with the W-CDMA standard, when the base station control apparatus 11 identifies that the radio base station connected thereto and disposed on a lower side is a micro base station 12a, and when the error correction coding which the radio base station performs on the common channel is convolutional coding, the base station control apparatus 11 instructs the micro base station 12a to carry out only convolutional coding as the error correction coding which is to be performed on a dedicated channel. That is, the base station control apparatus does not instruct the micro base station to carry out turbo coding.

FIG. 32 is a diagram showing control of the error correction coding at the time of a handover. In FIG. 32, a case in which the mobile communication terminal 13 carries out a handover from a large base station 12c to a micro base station 12a is shown. In the figure, the mobile communication terminal 13 is moving from the service area of the large base station 12c to the service area of the small base station 12a.

Next, an operation related to this embodiment will be explained.

The mobile communication terminal 13 is placed in a state in which it is communicating with the large base station 12c. The large base station 12c is transmitting packet data to the mobile communication terminal 13, and is using, as the error correction coding, not convolutional coding but turbo coding in order to improve its communication quality. The mobile communication terminal 13 is moving, and, when then enters the service area of the micro base station 12a from the service area of the large base station 12c, the base station control apparatus 11 changes the communications partner with the mobile communication terminal 13 from the large base station 12c to the micro base station 12a by using an HHO. When using an HHO, if identifying that the micro base station 12a is a micro base station, the base station control apparatus 11 controls the micro base station 12a so that it uses convolutional coding as the error correction coding on the packet data to be transmitted to the mobile communication terminal 13. After the base station control apparatus performs the HHO, communications between the mobile communication terminal 13 and the micro base station 12a are carried out only according to the convolutional coding.

FIG. 33 is a diagram showing a sequence of control of a handover. When the mobile communication terminal 13 enters the service area of the large base station 12c, the base station control apparatus 11, in step d1, transmits a channel setup request (turbo coding) to the large base station 12c in order to carry out a channel setup for the large base station 12c. The large base station 12c which has received the request, in step d2, returns a channel setup response (turbo coding) to the base station control apparatus 11.

After that, when the mobile communication terminal 13 approaches the service area of the micro base station 12a from the service area of the large base station 12c, the base station control apparatus 11, in step d3, transmits a channel setup request (convolutional coding) to the micro base station 12a in order to carry out a channel setup for the micro base station 12a. At that time, the base station control apparatus makes a request to carry out the same error correction coding as that done on the common channel. That is, in the case of a packet service, the base station control apparatus makes the micro base station carry out convolutional coding. The micro base station 12a which has received the request, in step d4, returns a channel setup response (convolutional coding) to the base station control apparatus 11.

When the mobile communication terminal 13 further approaches the micro base station 12a and then enters the service area of the micro base station 12a, the base station control apparatus 11, in step d5, makes a physical channel reconstruction request of the large base station 12c. The physical channel reconstruction request is notified also to the mobile communication terminal 13 via the large base station 12c. When the handover to the micro base station 12a by the mobile communication terminal 13 is completed, a physical channel reconstruction response is notified from the mobile communication terminal 13 to the base station control apparatus 11 via the micro base station 12a.

Thus, because the micro base station 12a improves its performance by using only the convolutional coding when performing the error correction coding, there is no necessity to incorporating any circuit intended for turbo coding in the channel coding circuit of the micro base station 12a. Therefore, the present embodiment offers an advantage of being able to reduce the circuit scale of the micro base station 12a.

BRIEF DESCRIPTION OF THE FIGURES

FIG. 1 is a block diagram showing a communication system in accordance with embodiment 1 of the present invention;

FIG. 2 is a diagram showing a procedure for acquiring base station scale information;

FIG. 3 is a diagram showing the base station scale information;

EXPLANATION OF REFERENCE NUMERALS

Figure 4:
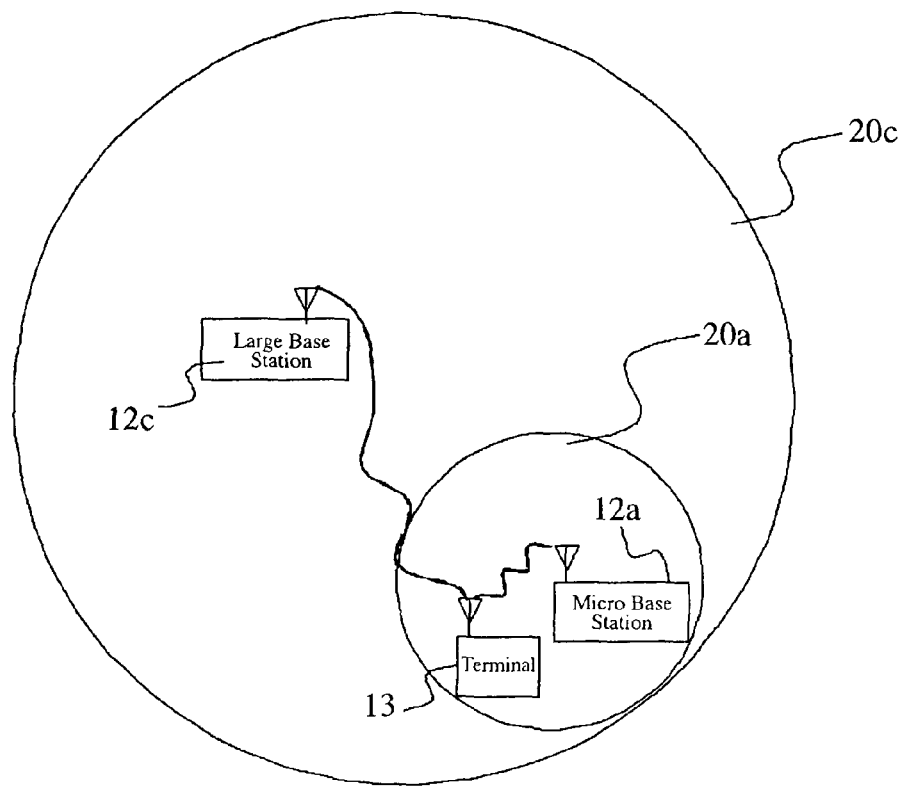
FIG. 4 is a state diagram showing handover control according to the scale of a base station.
Figure 5:
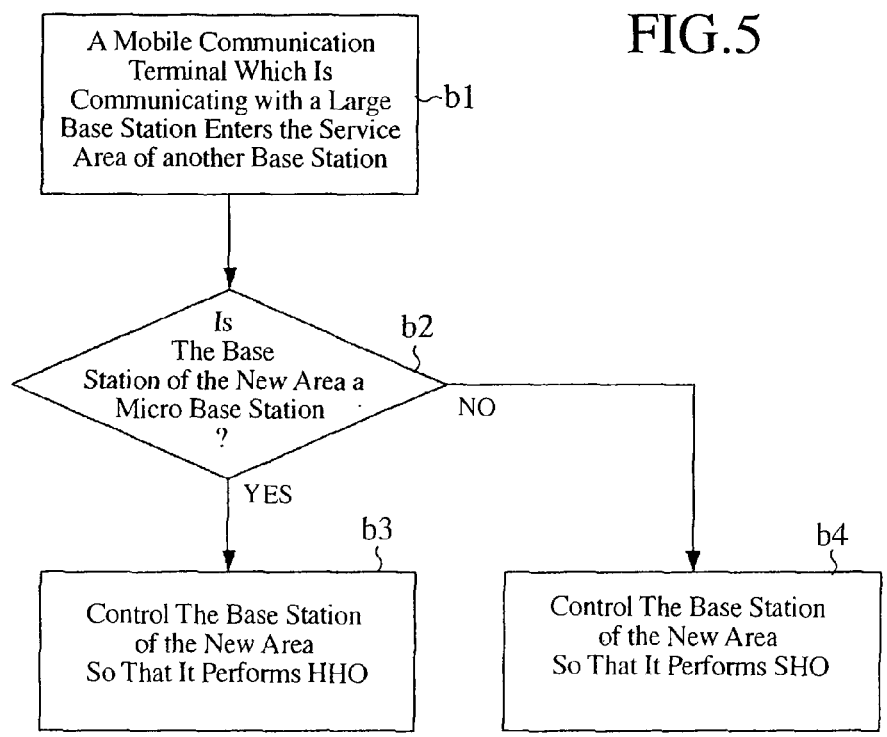
FIG. 5 is a flow chart showing a flow of the handover control process.
Figure 6:
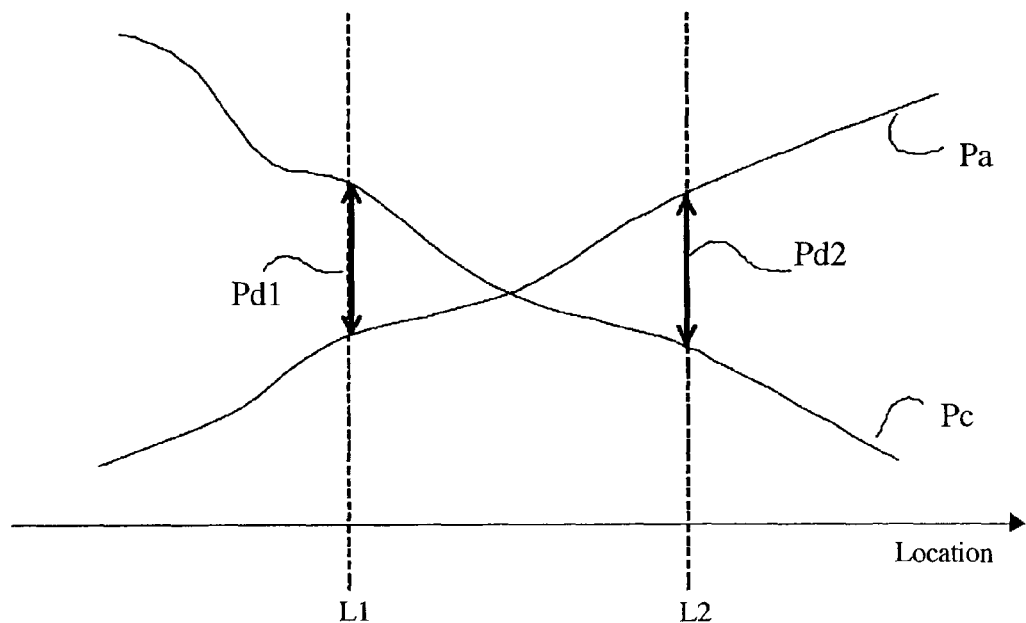
FIG. 6 is a diagram showing a relation between a handover and base station reception power.
Figure 7:
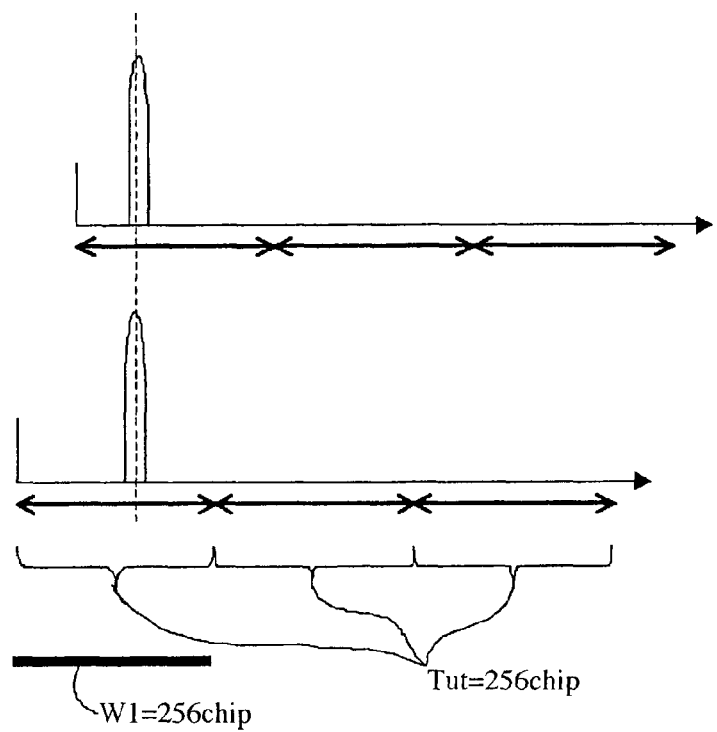
FIG. 7 is a timing chart showing path detection in a case in which a search window width is wide.
Figure 8:
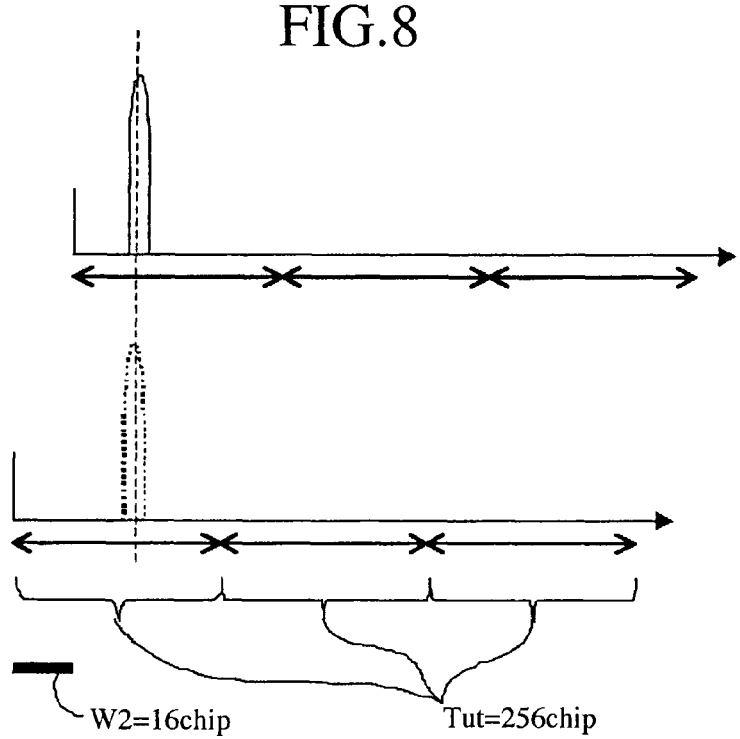
FIG. 8 is a timing chart showing path detection in a case in which a search window width is narrow.
Figure 9:
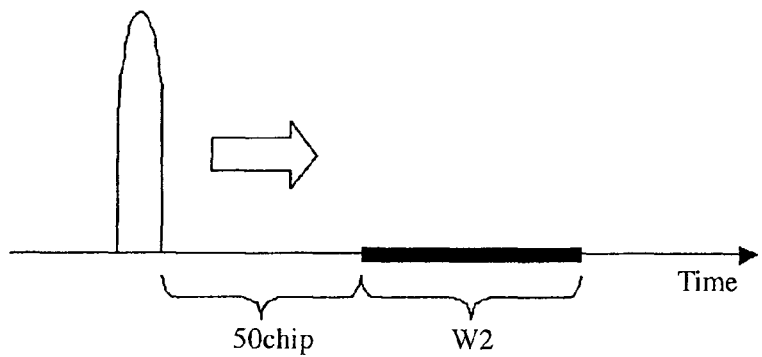
FIG. 9 is a timing chart showing the time which has elapsed until path detection using SHO is carried out.
Figure 10:
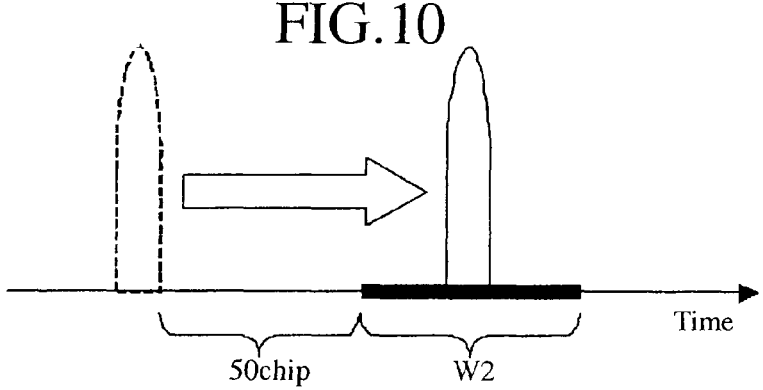
FIG. 10 is a timing chart showing the time which has elapsed until path detection using HHO is carried out.
Figure 11:
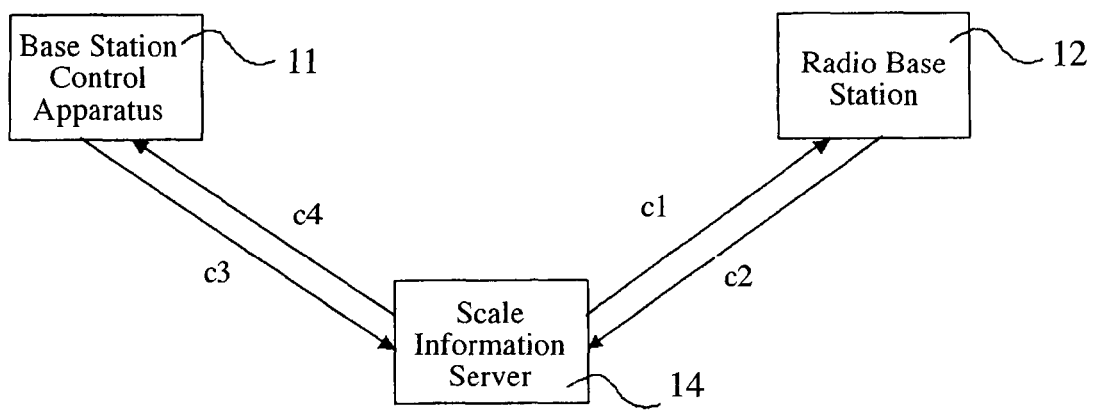
FIG. 11 is a diagram showing a procedure for acquiring the base station scale information by way of a scale information server.
Figure 12:
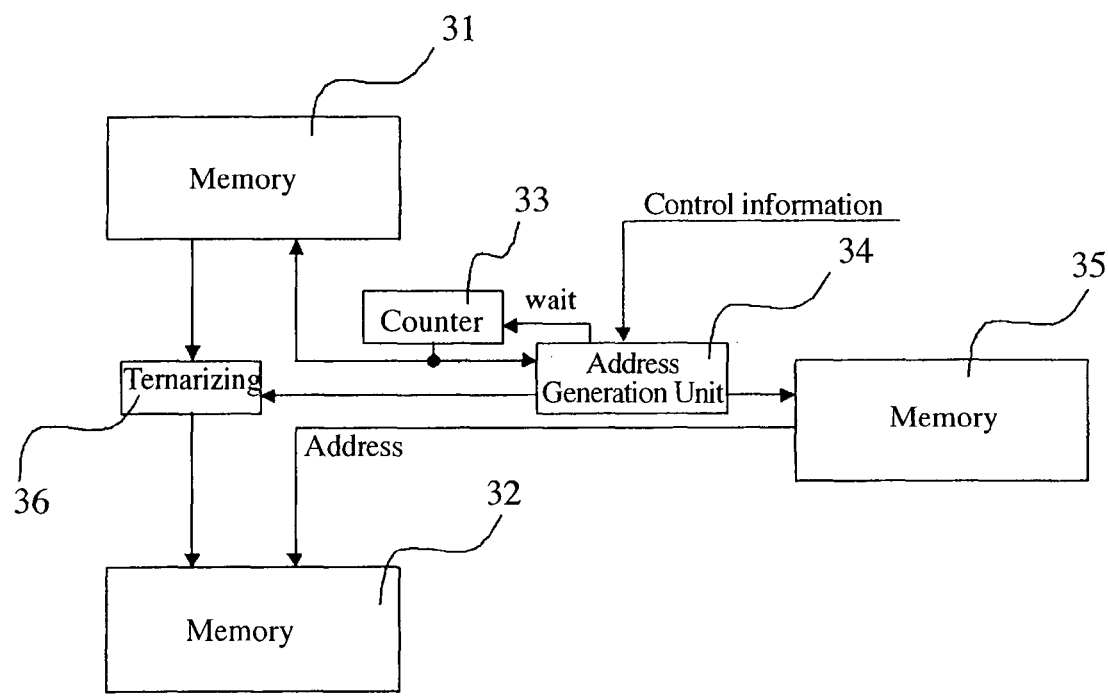
FIG. 12 is a diagram showing a structure intended for the channel coding of a micro base station.
Figure 13:
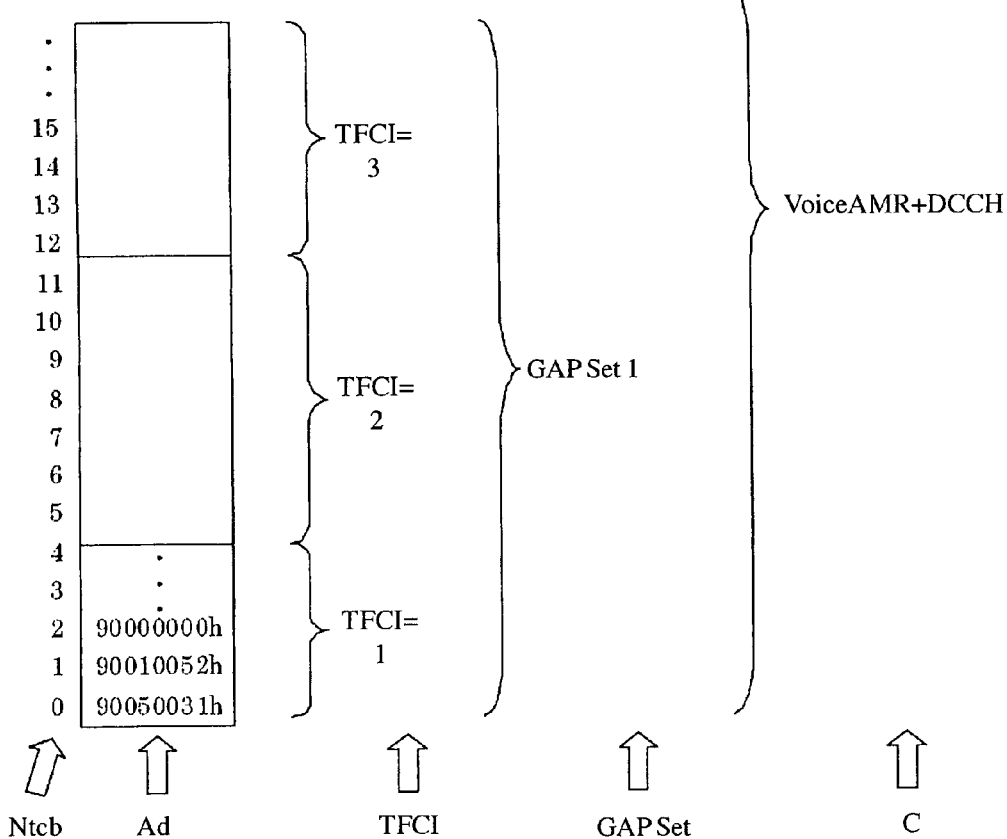
FIG. 13 is a diagram showing an array of data stored in a memory 32.
Figure 14:
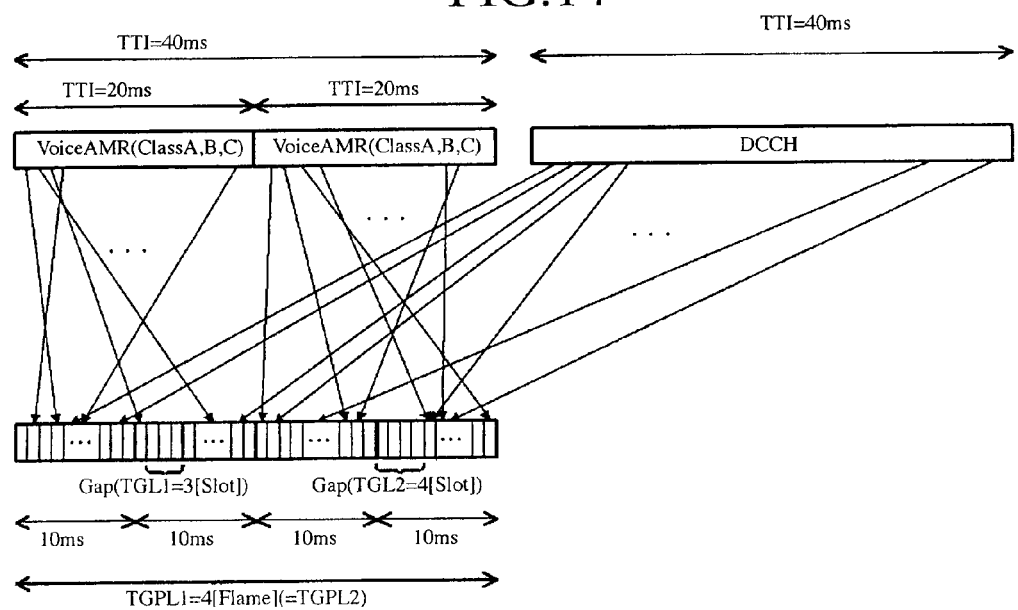
FIG. 14 is a diagram showing a first example of the channel coding.
Figure 15:
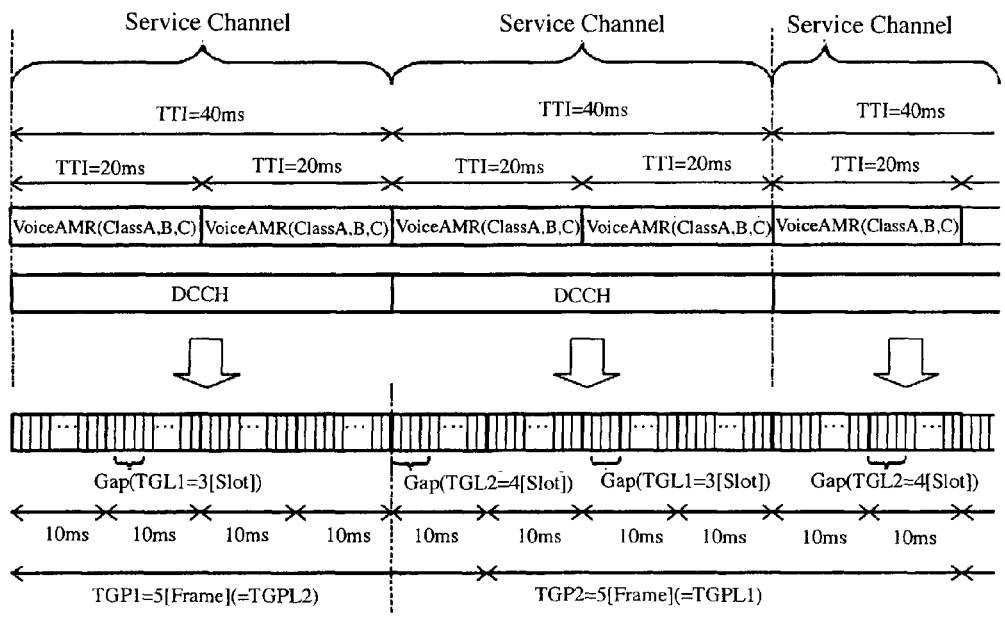
FIG. 15 is a diagram showing a second example of the channel coding.
Figure 16:
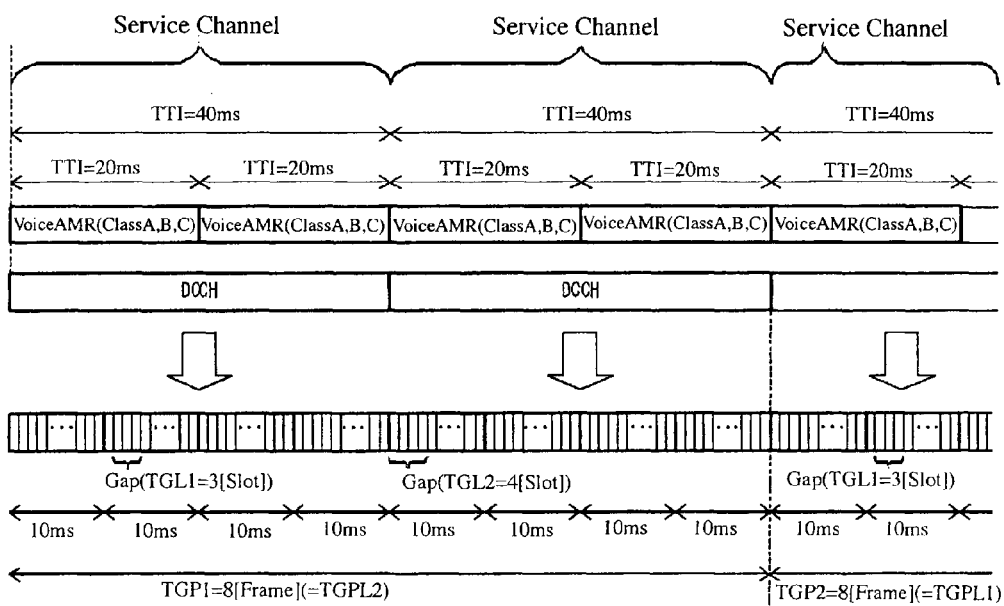
FIG. 16 is a diagram showing a third example of the channel coding.
Figure 17:
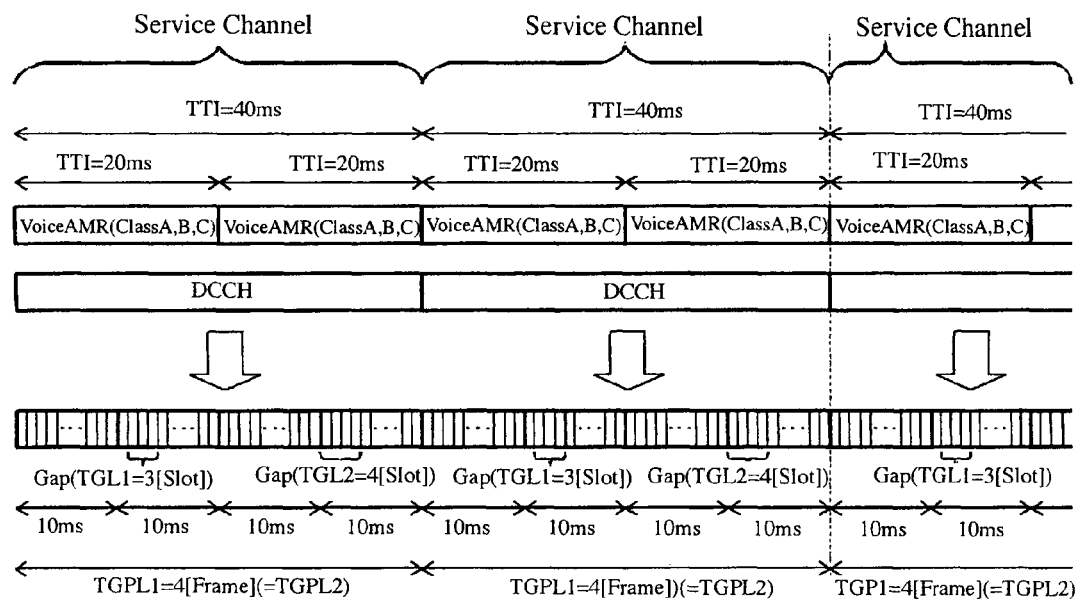
FIG. 17 is a diagram showing a fourth example of the channel coding.
Figure 18:
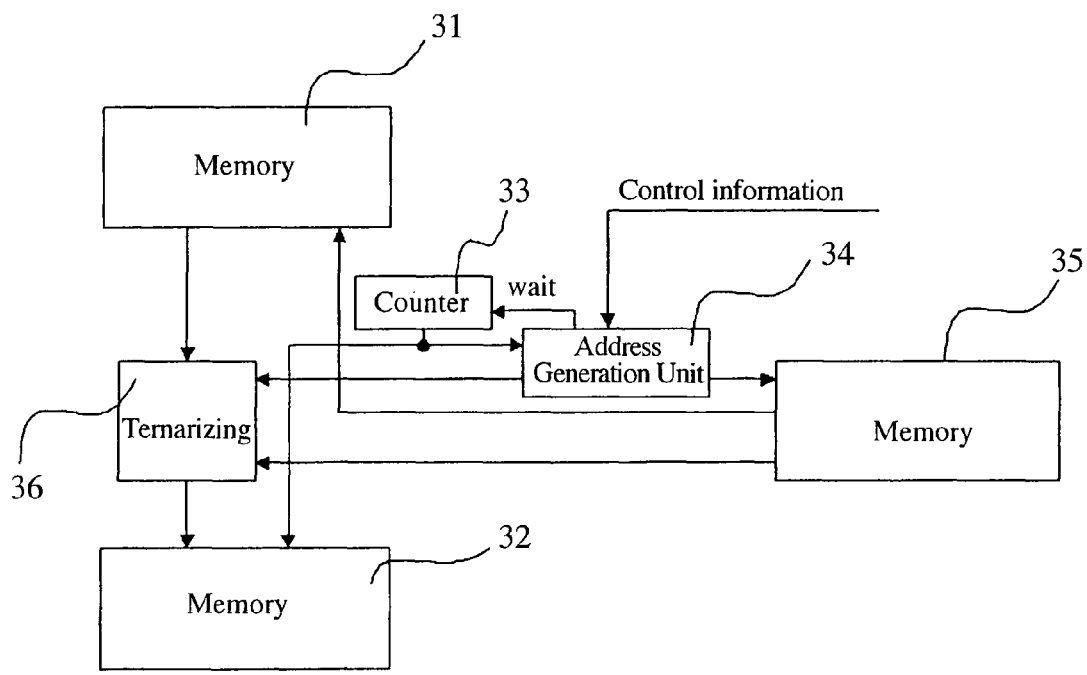
FIG. 18 is a diagram showing a second example of the structure intended for the channel coding of the micro base station.
Figure 19:
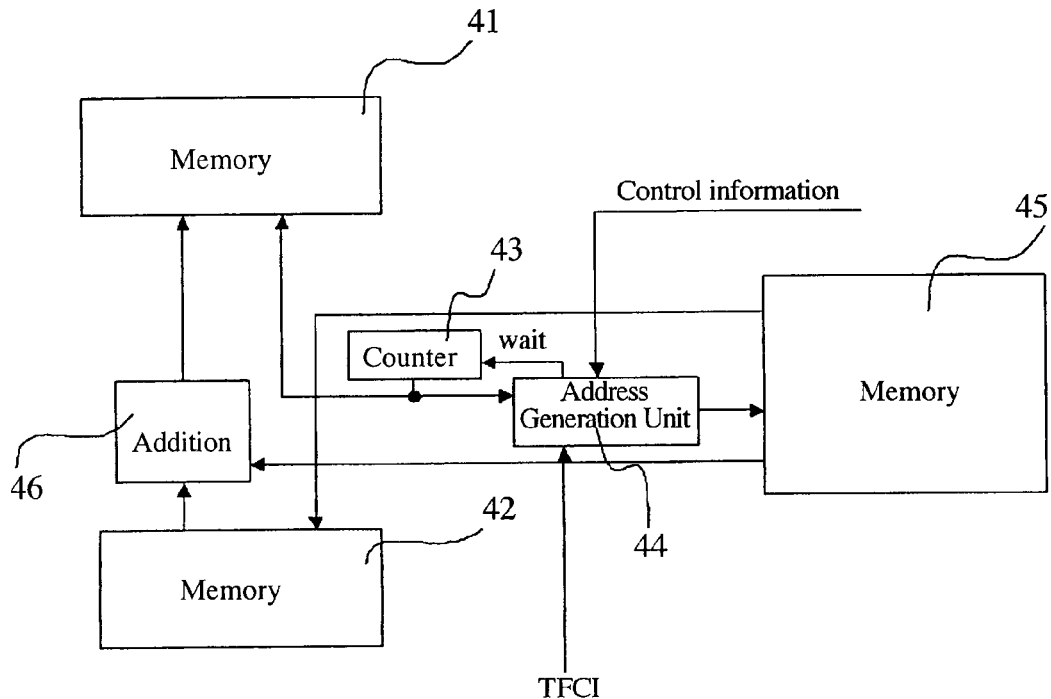
FIG. 19 is a diagram showing an example of the structure intended for the channel decoding of the micro base station.
Figure 20:
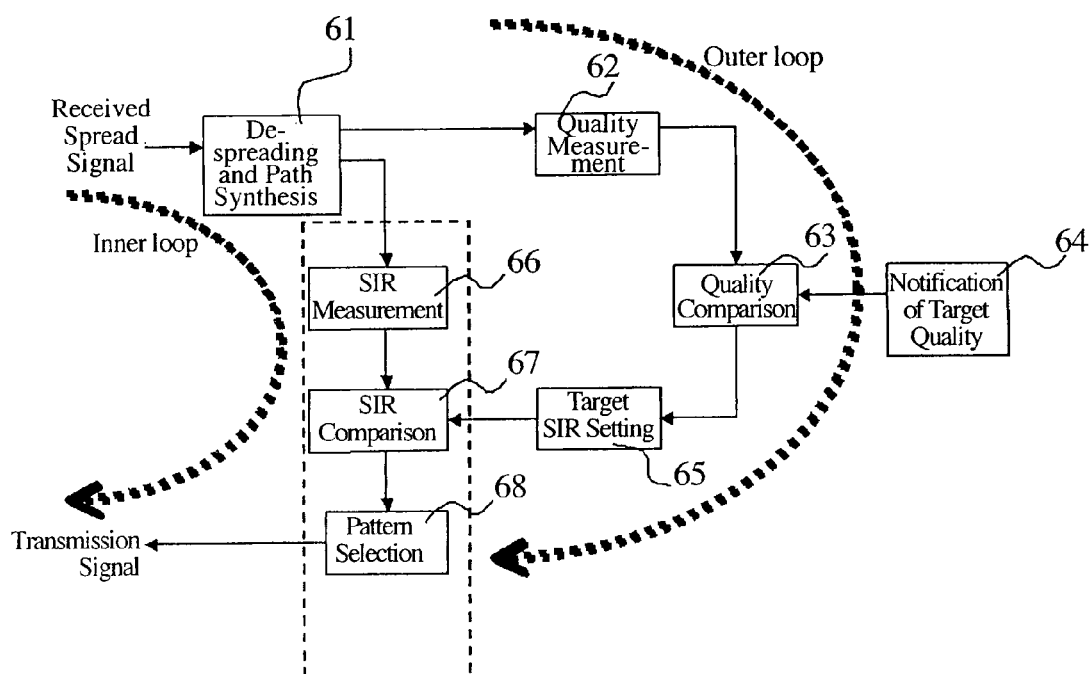
FIG. 20 is a diagram showing a structure intended for the transmission power control of the radio base station.
Figures 21, 22:
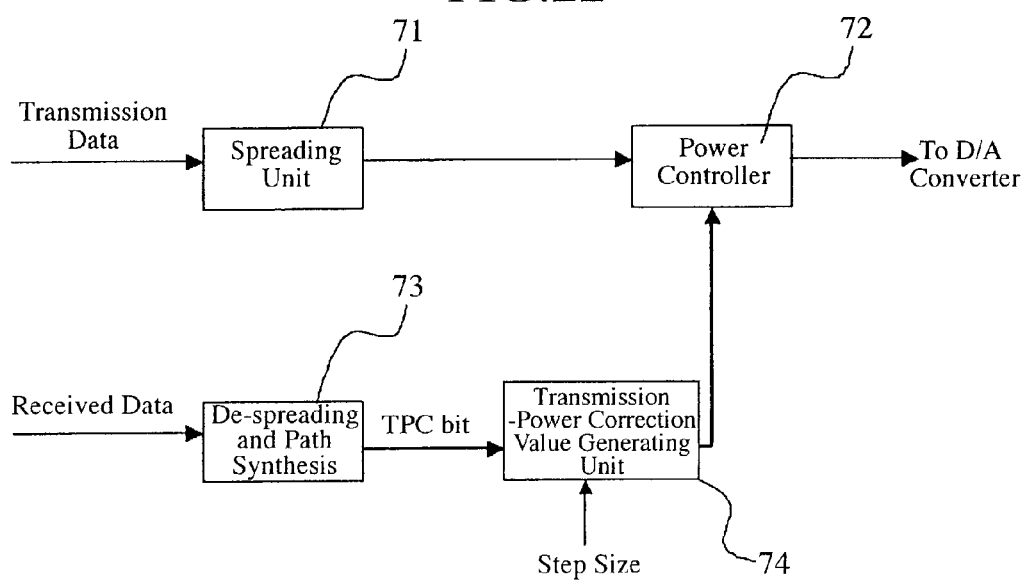
FIG. 21 is a diagram showing TPC bit patterns.
FIG. 22 is a diagram showing a structure intended for the transmission-power correction of the radio base station.
Figure 23:
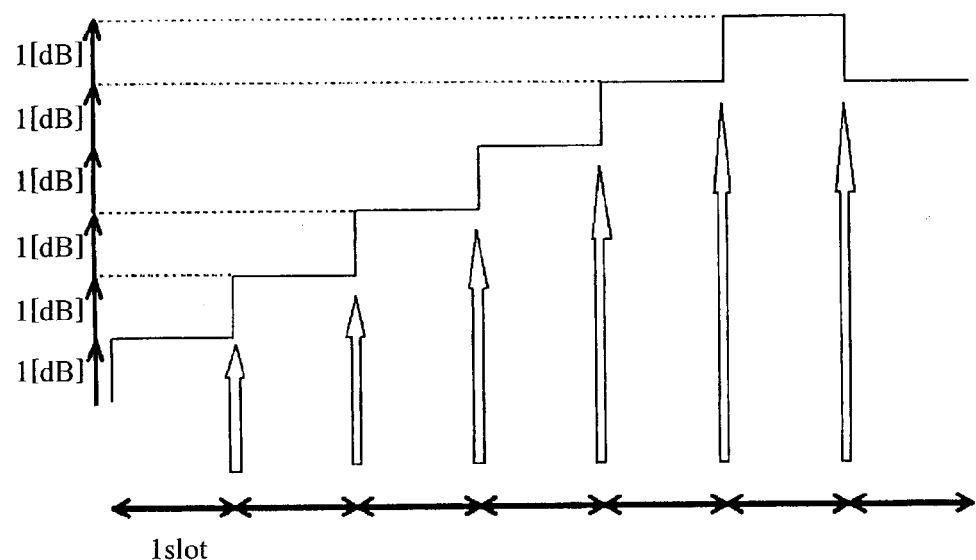
FIG. 23 is a diagram showing the transmission power in a case in which a transmission-power step size is small.
Figure 24:
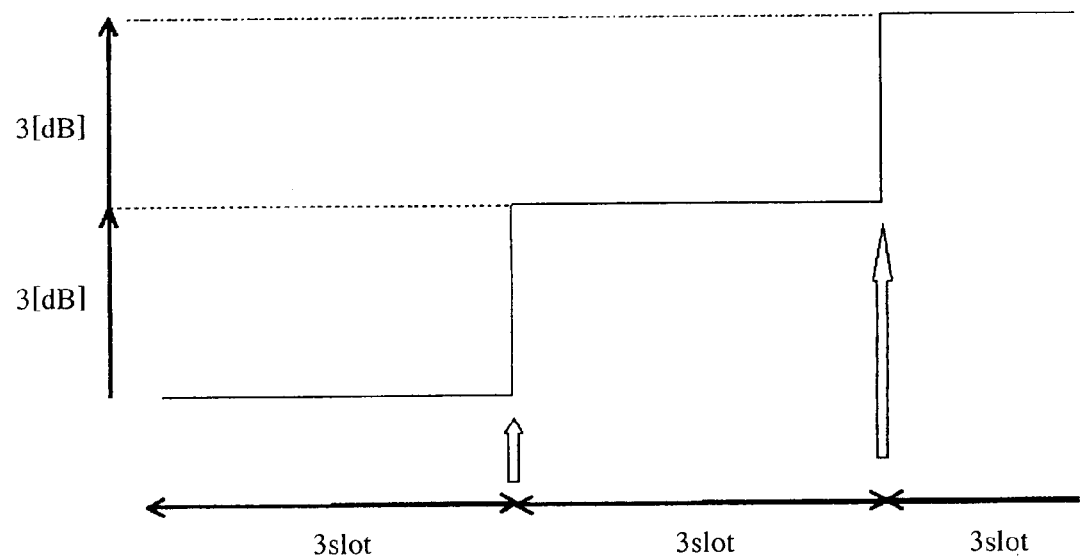
FIG. 24 is a diagram showing the transmission power in a case in which the transmission-power step size is large.
Figure 25:
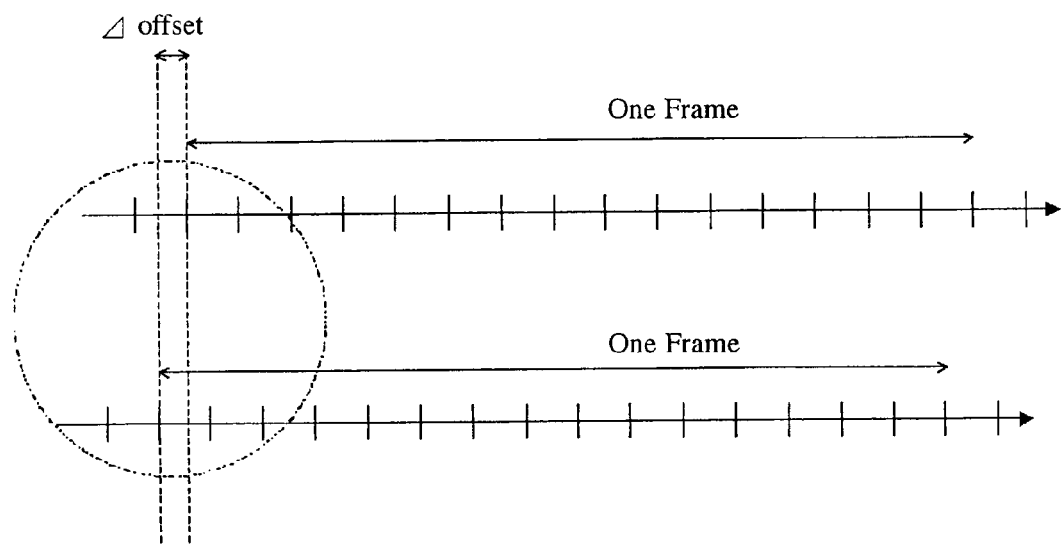
FIG. 25 is a diagram showing a delta offset.
Figure 26:
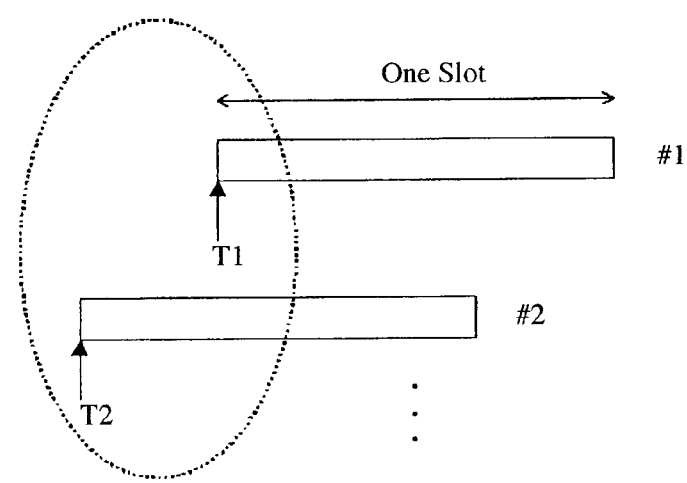
FIG. 26 is a diagram showing the transmission power control which is carried out for each channel.
Figure 27:
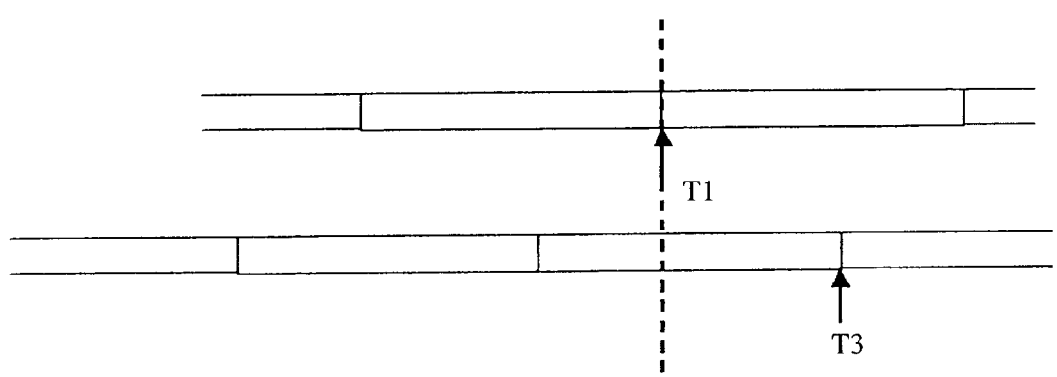
FIG. 27 is a diagram showing the transmission power control which is carried out collectively for all channels.
Figure 28:
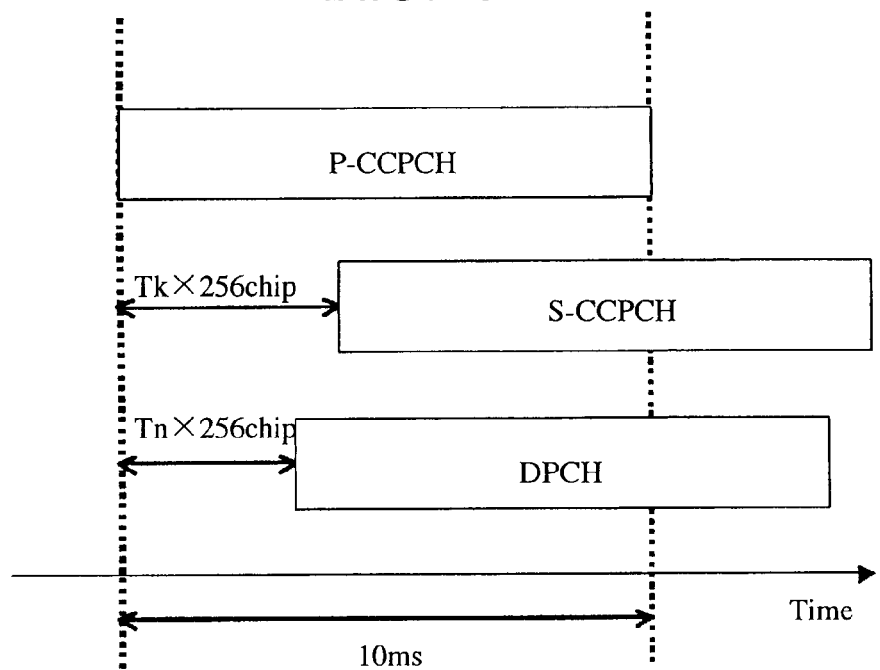
FIG. 28 is a diagram showing the timing of a dedicated channel and the timings of common channels.
Figure 29:
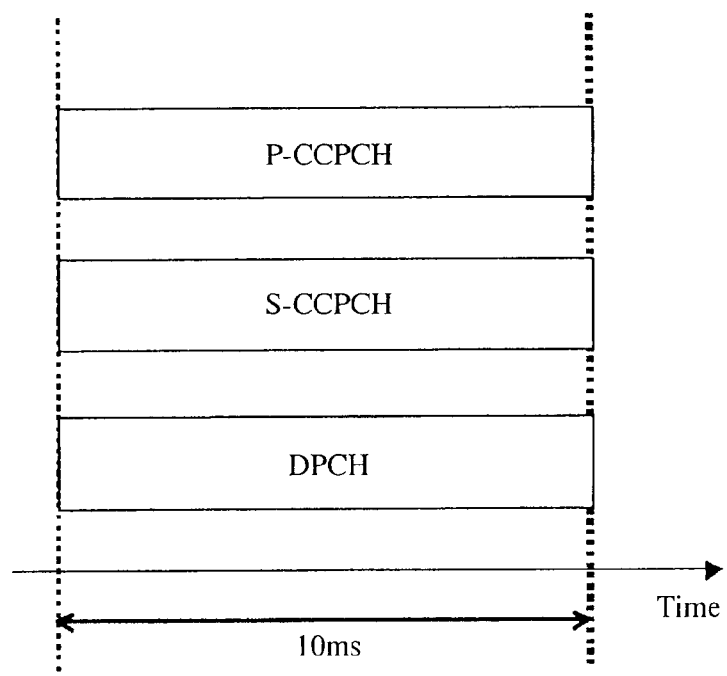
FIG. 29 is a diagram showing a case in which the timing difference among the channels is set to zero.
Figure 30:
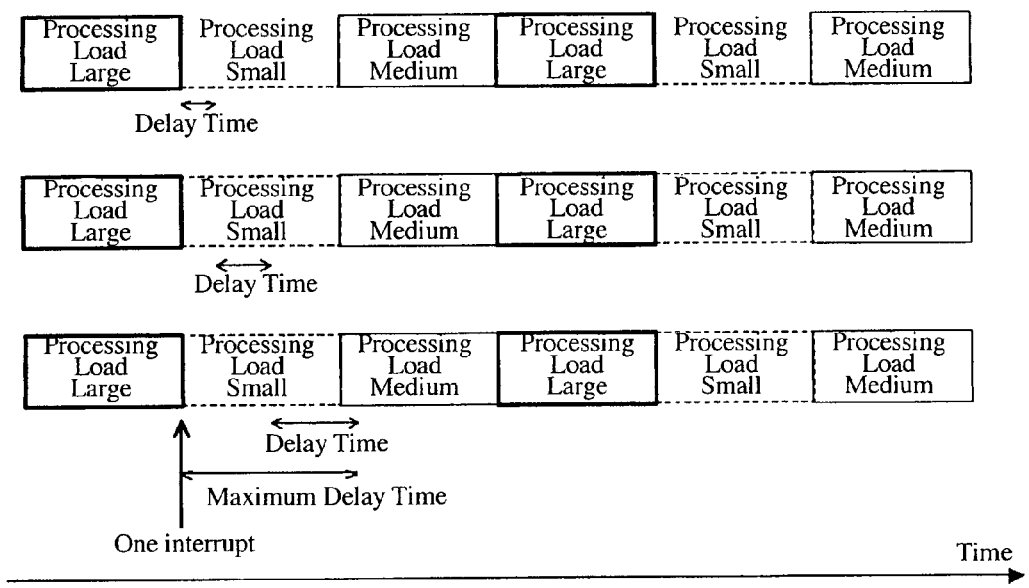
FIG. 30 is a diagram showing a processing load at the time of synchronizing the timings of all the channels with one another.
Figure 31:
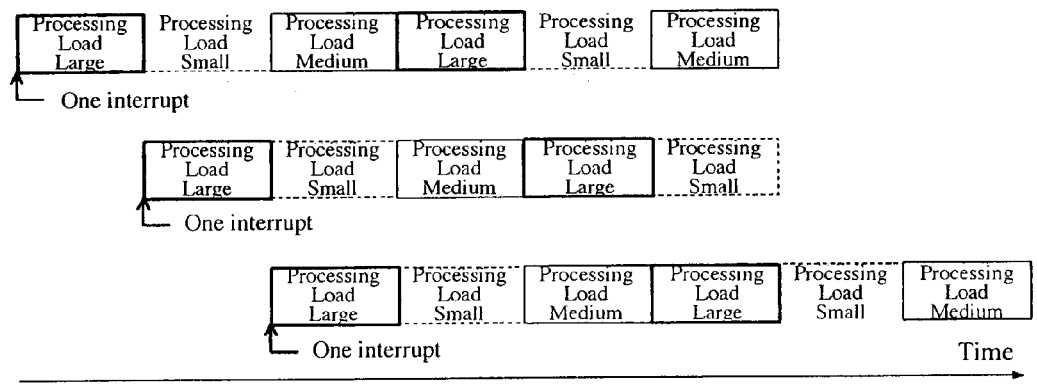
FIG. 31 is a diagram showing the processing load at the time when the timings of the channels are made to deviate from one another.
Figure 32:
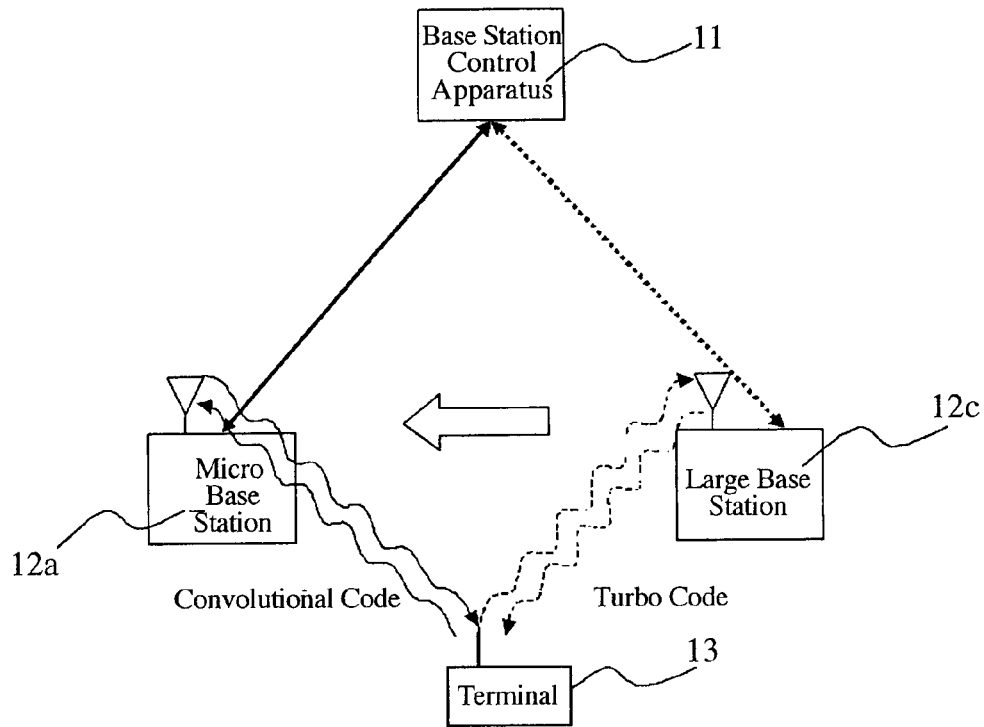
FIG. 32 is a diagram showing control of error correction coding at the time of a handover.
Figure 33:
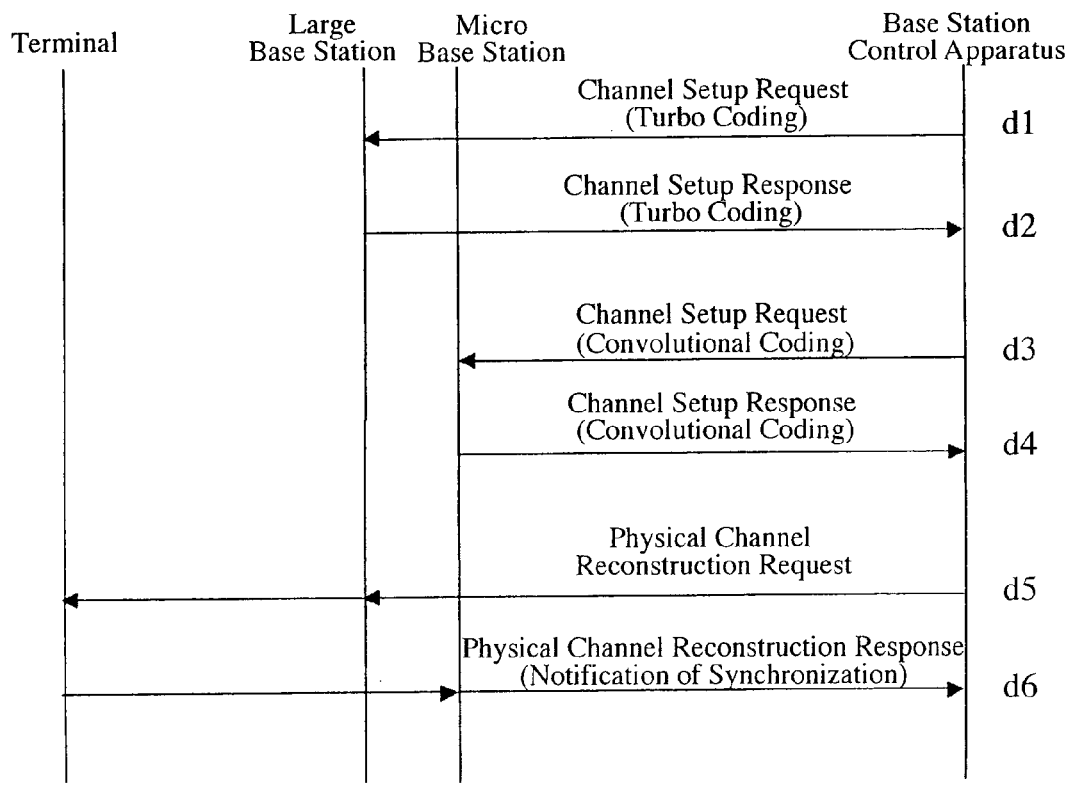
FIG. 33 is a diagram showing a sequence of control of a handover.

11 Base Station Control Apparatus
12 Radio Base Station
12a Micro base station
12b Small base station
12c Large base station
13 Mobile Communication Terminal
14 Scale Information Server
16 Cable Transmission Path
20a Service area (Micro Base Station)
20c Service area (Large Base Station)
21 Base-Station-Information Request Unit
22 Base-Station-Information Storage Unit
23 Scale Identifying Unit
24 Base Station Control Unit
31, 32, 35, 41, 42, and 45 Memory
33 and 43 Counter
34 and 44 Address Generation Unit
36 Ternarizing Unit
46 Adder Unit
61 De-spreading and Path synthesis
62 Quality Measurement Unit
63 Quality Comparison Unit
64 Target Quality Notifying Unit
65 Target SIR Setting Unit
66 SIR Measuring Unit
67 SIR Comparison Unit
68 TPC Bit Pattern Selecting Unit
71 Spreading Unit
72 Power Controller
73 De-spreading/Path Synthesis Unit
74 Transmission-Power Correction Generating Unit
L1 and L2 Location
Pa Power (Micro Base Station)
Pc Power (Large Base Station)
Pd1 and Pd2 Power Difference
W1 and W2 Search Window Width
T1 and T2 Timing
Tut Uplink Transmission Timing

The invention claimed is:

1. A base station control apparatus for controlling a radio base station that performs radio communications with a mobile communication terminal, said control apparatus comprising:
a control unit configured to perform a control process of making said radio base station selectively perform one of a plurality of processes having different throughputs based on a scale of the radio base station, the scale of the radio base station being a fixed property of the radio base station and being one of a base station type, a size derivable from an IP address of the radio base station, and a service cell radius of the radio base station,
wherein said control unit is configured to perform a control process of making the radio base station selectively perform one of a compressed mode process with a fixed transmission gap length and a compressed mode process with a variable transmission gap length, based on the scale of the radio base station.

2. A base station control apparatus for controlling a radio base station that performs radio communications with a mobile communication terminal, said control apparatus comprising:
a control unit configured to perform a control process of making said radio base station selectively perform one of a plurality of processes having different throughputs based on a scale of the radio base station, the scale of the radio base station being a fixed property of the radio base station and being one of a base station type, a size derivable from an IP address of the radio base station, and a service cell radius of the radio base station,
wherein said control unit is configured to perform a control process of making the radio base station selectively perform one of a plurality of transmission power control processes having different transmission power change periods, based on the scale of a radio base station.

3. A base station control apparatus for controlling a radio base station that performs radio communications with a mobile communication terminal, said control apparatus comprising:
a control unit configured to perform a control process of making said radio base station selectively perform one of a plurality of processes having different throughputs based on a scale of the radio base station, the scale of the radio base station being a fixed property of the radio base station and being one of a base station type, a size derivable from an IP address of the radio base station, and a service cell radius of the radio base station,
wherein said control unit is configured to perform a control process of making the radio base station selectively perform one of a plurality of transmission power control processes having different transmission power variations, based on the scale of a radio base station.

4. A base station control apparatus for controlling a radio base station that performs radio communications with a mobile communication terminal, said control apparatus comprising:
a control unit configured to perform a control process of making said radio base station selectively perform one of a plurality of processes having different throughputs based on a scale of the radio base station, the scale of the radio base station being a fixed property of the radio base station and being one of a base station type, a size derivable from an IP address of the radio base station, and a service cell radius of the radio base station,
wherein said control unit is configured to perform a control process of making the radio base station selectively perform one of a process of changing transmission power for each channel and a process of changing transmission powers for all channels at a time, based on the scale of the radio base station.

5. A base station control apparatus for controlling a radio base station that performs radio communications with a mobile communication terminal, said control apparatus comprising:
a control unit configured to perform a control process of making said radio base station selectively perform one of a plurality of processes having different throughputs based on a scale of the radio base station, the scale of the radio base station being a fixed property of the radio base station and being one of a base station type, a size derivable from an IP address of the radio base station, and a service cell radius of the radio base station, wherein said control unit is configured to perform a control process of making the radio base station selectively perform one of a process of transmitting data about each channel and a process of transmitting data about all channels at a time, based on the scale of the radio base station.

6. A base station control apparatus for controlling a radio base station that performs radio communications with a mobile communication terminal, said control apparatus comprising:

a control unit configured to perform a control process of making said radio base station selectively perform one of a plurality of processes having different throughputs based on a scale of the radio base station, the scale of the radio base station being a fixed property of the radio base station and being one of a base station type, a size derivable from an IP address of the radio base station, and a service cell radius of the radio base station, wherein said control unit is configured to perform a control process of making the radio base station selectively perform one of a plurality of error correction coding processes, based on the scale of the radio base station.

7. A base station control apparatus for controlling a radio base station that performs radio communications with a mobile communication terminal, said control apparatus comprising:

a control unit configured to perform a control process of making said radio base station selectively perform one of a plurality of processes having different throughputs based on a scale of the radio base station, the scale of the radio base station being a fixed property of the radio base station and being one of a base station type, a size derivable from an IP address of the radio base station, and a service cell radius of the radio base station, wherein said control unit is configured to perform a control process of making the radio base station selectively perform, on a dedicated channel, one of an error correction coding process that is a same as that performed on a common channel, and an error correction coding process that is different from that performed on the common channel, based on the scale of the radio base station.

8. A base station control apparatus for controlling a radio base station that performs radio communications with a mobile communication terminal, said control apparatus comprising:

a control unit configured to perform a control process of making the radio base station selectively perform one of a plurality of processes having different throughputs based on a scale of the radio base station, the scale of the radio base station being a fixed property of the radio base station and being determined by an IP address of the radio base station.

* * * * *